(12) United States Patent
Squire et al.

(10) Patent No.: US 12,720,157 B2
(45) **Date of Patent: *Aug. 25, 2026**

(54) SYSTEM AND METHOD FOR CHANNEL CHANGE DETECTION AND OVERLAY DETECTION FOR A BROADCAST OUTPUT

(71) Applicant: SAMBA TV, INC., San Francisco, CA (US)

(72) Inventors: Christopher Squire, San Francisco, CA (US); David Harrison, San Francisco, CA (US)

(73) Assignee: SAMBA TV, INC., San Francisco, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 18/890,563

(22) Filed: Sep. 19, 2024

(65) Prior Publication Data

US 2025/0016405 A1 Jan. 9, 2025

Related U.S. Application Data

(63) Continuation of application No. 18/017,618, filed as application No. PCT/US2021/042773 on Jul. 22, 2021, now Pat. No. 12,126,860.

(Continued)

(51) Int. Cl.
*H04N 21/44* (2011.01)
*H04N 21/442* (2011.01)

(Continued)

(52) U.S. Cl.
CPC . *H04N 21/44016* (2013.01); *H04N 21/44004* (2013.01); *H04N 21/44008* (2013.01);

(Continued)

(58) Field of Classification Search
CPC ....... H04N 21/44016; H04N 21/44004; H04N 21/44008; H04N 21/442; H04N 21/812;

(Continued)

(56) References Cited

U.S. PATENT DOCUMENTS 8,218,651 B1 7/2012 Eshet et al.
9,161,078 B2 10/2015 Chen et al.

(Continued)

OTHER PUBLICATIONS

Communication under Rule 71(3) EPC received in corresponding EP Application No. 21847442.7, dated Apr. 24, 2025, in 65 pages.
Extended European Search Report received in corresponding EP Application No. 25204679.2, dated Oct. 16, 2025, in 11 pages.
Extended European Search Report received in EP Application No. 21847442.7, dated Mar. 19, 2024, in 10 pages.

*Primary Examiner* — Kunal Langhnoja
(74) *Attorney, Agent, or Firm* — Procopio, Cory, Hargreaves & Savitch LLP

(57) ABSTRACT

A computer-implemented method of channel change detection and overlay detection for a broadcast output, the computer-implemented method comprises providing a broadcast stream for a display; dividing the display into one or more regions, and selecting at least one of the one or more regions; based on the selected one or more regions, determining a first content associated with the broadcast stream; at a time associated with an insertion point for a second content, determining whether the determined first content associated with the broadcast stream matches a target content associated with insertion of the second content in the broadcast stream at the insertion point; for the first content not matching the target content, blocking the insertion of the second content; and for the first content not matching the target content, performing the insertion of the second content.

18 Claims, 18 Drawing Sheets

Related U.S. Application Data

(60) Provisional application No. 63/056,244, filed on Jul. 24, 2020.

(51) Int. Cl.
*H04N 21/81* (2011.01)
*H04N 21/8358* (2011.01)

(52) U.S. Cl.
CPC ......... *H04N 21/442* (2013.01); *H04N 21/812* (2013.01); *H04N 21/8358* (2013.01)

(58) Field of Classification Search
CPC ........... H04N 21/8358; H04N 21/4312; H04N 21/4622
See application file for complete search history.

(56) References Cited

U.S. PATENT DOCUMENTS

2002/0194593 A1* 12/2002 Tsuchida ............ H04N 21/4316
348/E7.083
2011/0078740 A1* 3/2011 Bolyukh .............. H04N 21/812
725/41
2011/0126227 A1* 5/2011 Corvin .................. H04N 21/44
725/32
2019/0132652 A1 5/2019 Zhao et al.
2019/0356965 A1 11/2019 Winograd et al.

* cited by examiner

1200

SYSTEM AND METHOD FOR CHANNEL CHANGE DETECTION AND OVERLAY DETECTION FOR A BROADCAST OUTPUT

CROSS-REFERENCE TO RELATED APPLICATIONS

The present application is a continuation of U.S. application Ser. No. 18/017,618, filed Jan. 23, 2023, which is a 371 national phase application of PCT/US2021/042773, filed on Jul. 22, 2021, which claims priority to U.S. Provisional Patent App. No. 63/056,244, filed on Jul. 24, 2020, which is hereby incorporated herein by reference as if set forth in full.

BACKGROUND

Field

Aspects of the example implementations relate to methods, systems and user experiences associated with detection of channel change and detection of an overlay, such as in the context of dynamic ad insertion associated with content broadcasting.

Related Art

In related art content broadcast schemes, a user may view a broadcast program on a television. The television may receive the broadcast program associated with a content provider from a set top box or satellite. For a single broadcast stream, different ads may be provided to different viewers, based on various factors associated with the different viewers, such as preferences, demographics, etc.

For example, in Internet-based video delivery systems, where the received video stream may be unique to each viewer, different ads may be provided for each user. Because of the one-to-one relationship between the content of the video stream and the user, as opposed to a broadcast distribution approach, it is possible for ads to be selectively spliced into the video stream for one viewer, without affecting the user experience of other viewers.

On the other hand, in the context of broadcast video distribution, the relationship between the source and destination is one to many. Thus, multiple viewers each receive the same signal from the source at the same time. The broadcast video distribution may be provided, for example, by terrestrial, satellite, and/or cable distribution systems, to the set top box.

According to one related art example, viewers Alice and Bob are watching broadcast content Foo at the same time, and are physically located in the same market. To achieve ad insertion for Alice that does not affect Bob's user experience, a television or a set-top box (STB) in Alice's home inserts an advertisement. Thus, Alice views the inserted advertisement (e.g., with insertion being performed in the television), while Bob views the advertisement that is broadcast by the source.

Related art ad insertion approaches for televisions require addressing various technical considerations. For example, the content of the broadcast program that is being rendered by the television must be identified, also referred to as content identification (CID). Addressing the CID issue may require searching through a large database of potential content to detect a match. Additionally, an appropriate insertion point for the advertisement into the broadcast video stream must be determined. Further, when a viewer changes content (e.g., changing the channel), such a content change must be detected in a timely manner, so as to avoid insertion of the ad into wrong content. Also, a set-top box associated with the television may have menus or overlays onto the broadcast content such as overlays for navigation, for various functions of the television; if such menus or overlays are blocked or obscured by an inserted ad, the user may consider the television to be non-operational.

With respect to the foregoing technical considerations, if the broadcast content is substantially changed, a determination may be made that a channel has been changed. Once a channel change has been detected, it is necessary to identify the content of the new channel.

FIG. 1 illustrates an example 100 of a dynamic ad insertion (DAI) performed by a television during a broadcast. More specifically, a viewer 101 can view broadcast content displayed by a television 103, which is connected to STB 105. The STB 105 provides a broadcast 107 that includes a first advertisement 109. DAI occurs when the television 103 replaces the first advertisement 109 with a second advertisement 111. Thus, the viewer 101 views the broadcast 113 that includes the dynamically inserted ad 111.

On the other hand, the related art dynamic ad insertion scheme has various problems and disadvantages. For example, but not by way of limitation, as shown in FIG. 2, an example 200 illustrates the related art problem associated with drag (e.g., the period of time between when a channel change is performed, and when the channel change is detected). A viewer 201 can view broadcast content from a television 203, which is connected to an STB 205. The STB 205 provides a broadcast 207, wherein the user has selected and is watching a broadcast video on Channel Foo. At some point during the broadcast, the viewer changes from Channel Foo to Channel Bar, which results in the broadcast video 209.

However, based on the original broadcast 207, advertisement 211 is to be inserted into the stream of the broadcast to replace original advertisement 215. Due to the above described related art problem associated with the drag, the advertisement 211 is inserted into the broadcast 213 that is provided to the viewer at the insertion point intended for broadcast 207 on Channel Foo.

Because the television 203 has already initiated the ad insertion process to replace the original advertisement 215 with a new advertisement 211, the television is slow to detect the channel change. As a result, the viewer continues to view the commercial 211, and the change of the channel as intended by the viewer from stream 207 to stream 209 is delayed. Thus, there is a related art problem of delayed channel change.

In this example, the channel change occurs in close proximity to a point of ad insertion, and the ad insertion occurs prior to the detection of the channel change. As a result, the inserted ad may appear in the wrong content, because the duration of the inserted ad overlaps with the drag.

Accordingly, the related art ad insertion scheme may have various problems and/or disadvantages. For example, but not by way of limitation, if the timing of the inserted ad is incorrectly determined or delayed, then original ad truncation may occur. More specifically, the inserted ad begins after the insertion point. Thus the original ad is displayed in part, and then replaced by the inserted ad.

Additionally, the inserted ad may be inserted over the wrong content. More specifically, an inserted ad may be placed at an insertion point that is incorrectly determined based on a misidentification of the original content (e.g., content ID indicates that the user is watching a first content (e.g., channel or show) when the user is actually watching a second content (e.g., channel or show). Further, a misestimation of the time may occur within the original content, or the above displayed drag problem (e.g., the system correctly identifies the first content, but is slow to recognize when the user changes from the first content to the second content) may occur during a channel change. The foregoing misidentification, misestimation and drag issues may result in an ad being inserted at an undesirable location of a broadcast.

Another related art problem or disadvantage may relate to delayed channel change. A user may change the channel while an inserted ad is being displayed. If this occurs, the inserted ad may not be torn down quickly, and the channel change may be delayed.

Yet another related art issue is incorrect teardown. For example, a channel change may be incorrectly detected. In such a condition, the television may prematurely switch the content displayed to the user, from an inserted ad back to the original content. As a result, the inserted ad may be truncated.

Further, the STB may provide a user interface element or overlay, such as a menu. The television may insert an add on top of the user interface element, so as to interfere with the ability of a user to interact with the user interface of the STB, for example, as explained above.

Accordingly, there is an unmet need to address one or more of the foregoing related art problems and/or disadvantages.

SUMMARY

According to aspects of the example implementations, a computer-implemented method of channel change detection and overlay detection for a broadcast output is provided. The computer-implemented method comprises providing a broadcast stream for a display; dividing the display into one or more regions, and selecting at least one of the one or more regions; based on the selected one or more regions, determining a first content associated with the broadcast stream; at a time associated with an insertion point for a second content, determining whether the determined first content associated with the broadcast stream matches a target content associated with insertion of the second content in the broadcast stream at the insertion point; for the first content not matching the target content, blocking the insertion of the second content; and for the first content not matching the target content, performing the insertion of the second content.

Example implementations may also include a non-transitory computer readable medium having a storage and processor, the processor capable of executing instructions for channel change detection and overlay detection for a broadcast output.

DETAILED DESCRIPTION

Figure 1:
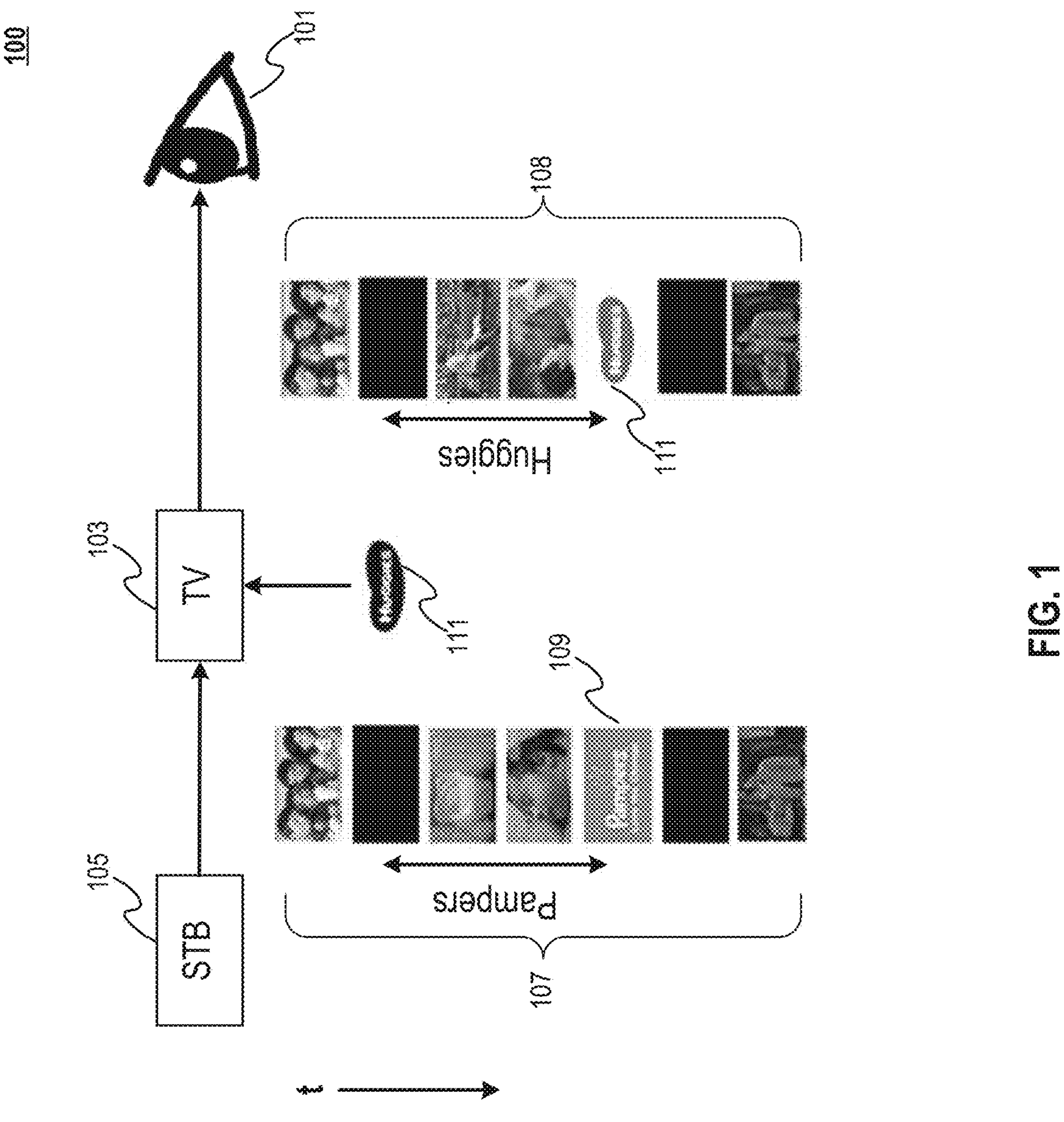
FIG. 1 illustrates a related art example of dynamic ad insertion performed by a television during a broadcast.
Figure 2:
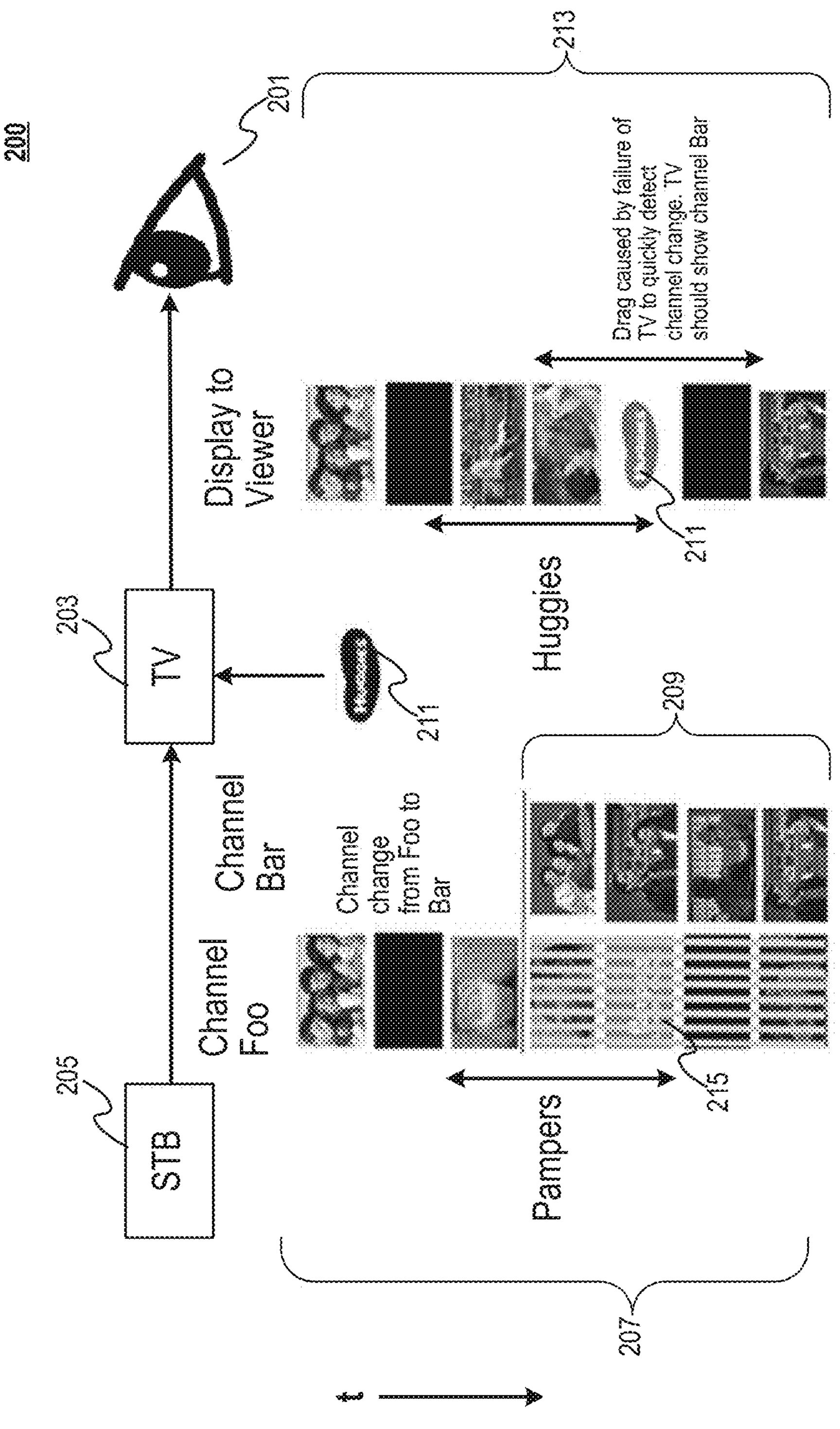
FIG. 2 illustrates a related art problem associated with drag with respect to related art dynamic ad insertion.

The following detailed description provides further details of the figures and example implementations of the present application. Reference numerals and descriptions of redundant elements between figures are omitted for clarity. Terms used throughout the description are provided as examples and are not intended to be limiting.

As used herein, the term "drag" refers to a time between when a channel change is performed, and when it is detected. The term "match" refers to a condition when a fingerprint from a television is substantially identical to a fingerprint in the database, within a threshold. The term "miss" refers to a fingerprint from a television that is not found in a database, or that matches to the wrong content. The term "multichannel video programming distributor" (MVPD) includes a cable operator, a multichannel multipoint distribution service, a direct broadcast satellite service or an online satellite program distributor, that makes multiple channels of video programming available for purchase by subscribers or customers. The term "inserted content" refers to content that replaces at least a subset of original content (e.g., the content that arrives from the set-top box, which, in the case of an ad, may be the original ad); for example, if the inserted content is an ad, then it may be referred to as an "inserted ad".

Additionally, the term "dynamic ad replacement" (DAR) is used herein to refer to the replacement of an ad that is already in a broadcast stream. The term "dynamic ad insertion" (DAI) refers to insertion of content, such as advertisements, into a stream of content at an insertion point, such as an ad insertion point, or a prescriber predetermined ad insertion point. For example, in the instance of a broadcast stream as the stream of content, ad insertion may refer to the replacement of an existing ad that is already appearing in the broadcast stream.

Figure 9:
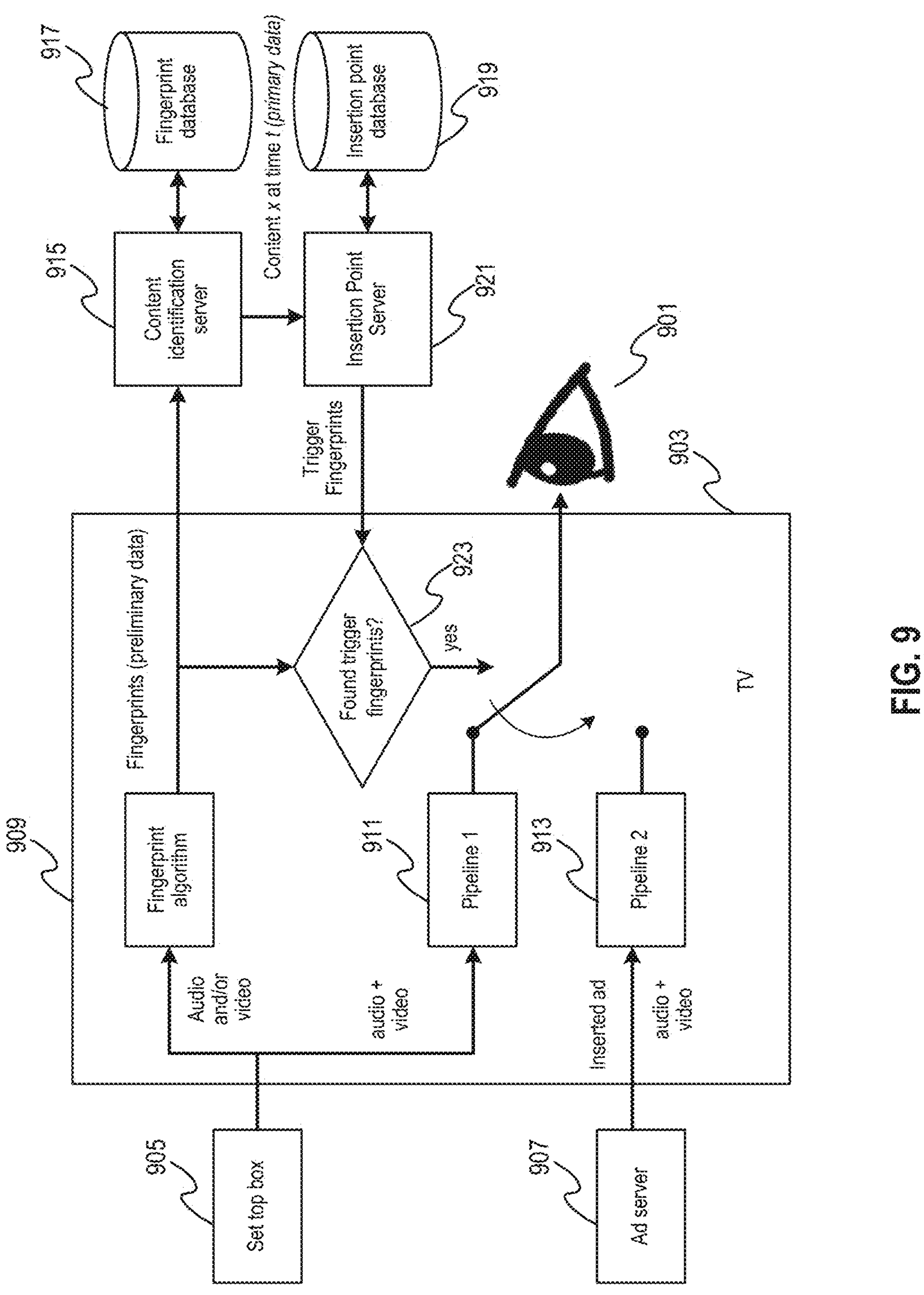
FIG. 9 illustrates aspects associated with the introduction of an insertion point identification algorithm in the television, according to the example implementations.

Further, the terms FIG. 9 includes the terms "preliminary data" and "primary data." As used herein, "preliminary data" may refer to fingerprints, watermarks, EPG data, and "primary data" may refer to the content ID.

According to various aspects of the example implementations, watermarks and/or fingerprints may be employed. Further, aspects of the example implementations may be directed to channel change detection and/or overlay detection methods and systems. These aspects may have various benefits and/or advantages, including but not limited to improved speed and reliability, as well as avoiding detrimental user experiences.

Figure 3:
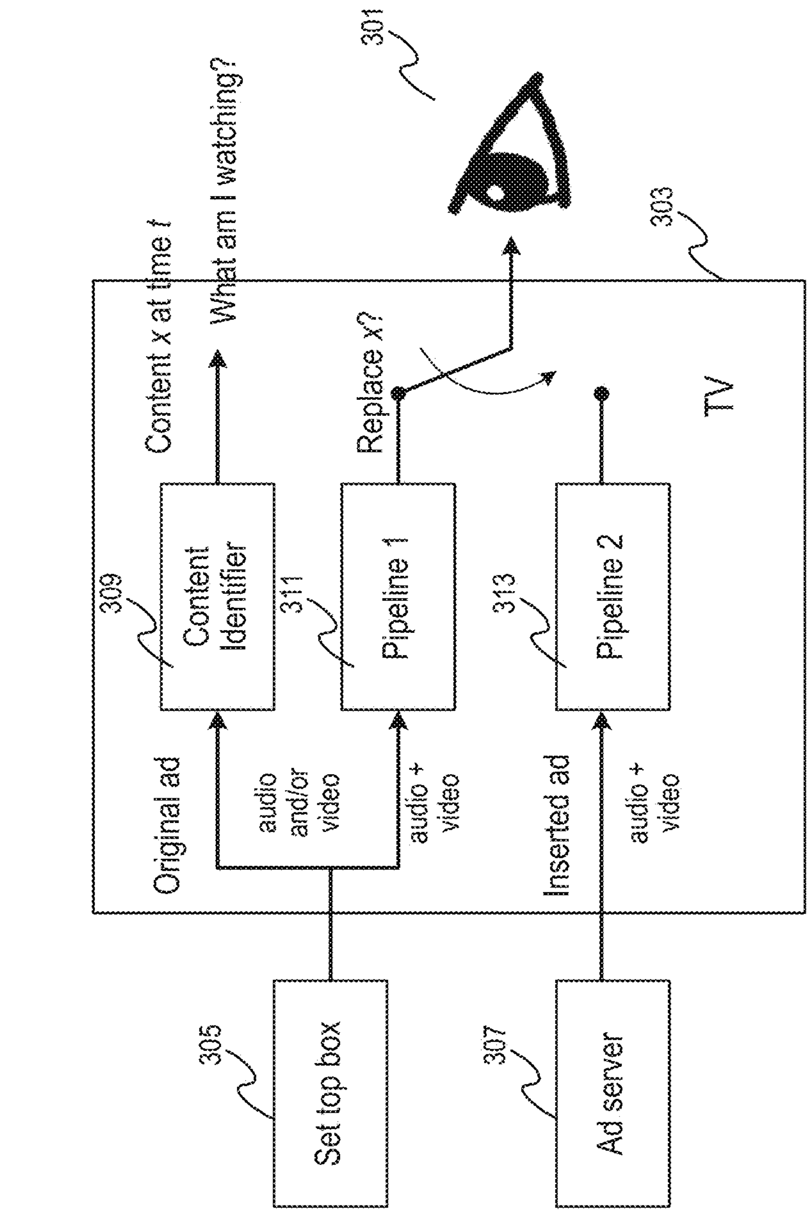
FIGS. 3 and 4 illustrate various aspects of content identification and channel change detection, according to the example implementations.
Figure 4:
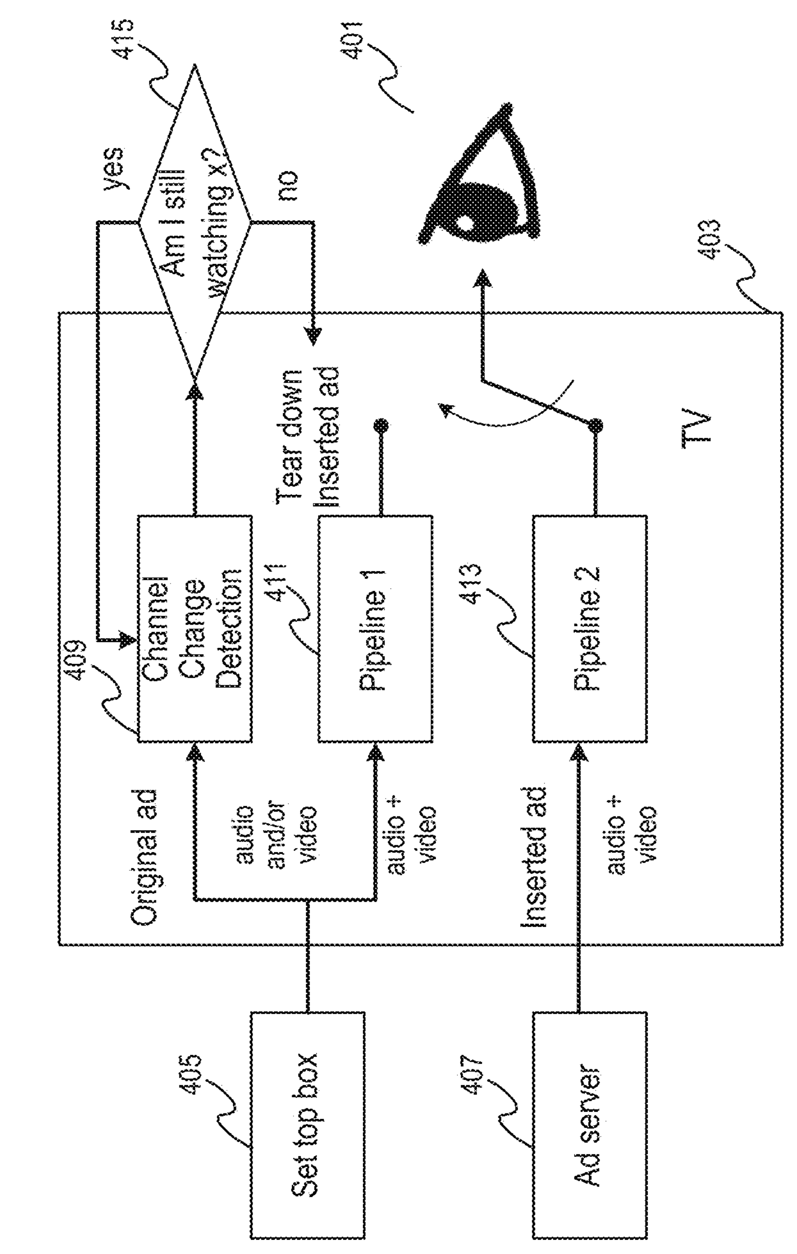

FIGS. 3 and 4 illustrate various aspects of content identification and channel change detection, according to the example implementations. The concept of content identification is directed to the question of "what in the universe is the user watching?" (for example, but not by way of limitation, for the set of all content for which there are fingerprints in the fingerprint database, what is the user watching?). On the other hand, the concept of channel change identification is directed to the question of "is the user still watching content X?".

FIG. 3 illustrates an example implementation directed to an insertion that uses content identification detection at 300. For example, but not by way of limitation, this example implementation may be employed in a chipset integrated in a television. Such a chipset may have more than one video pipeline (e.g., to support picture-in-picture or PIP mode), such that the "original content" may be provided through a first pipeline, while an ad is being buffered in a second pipeline prior to an insertion point.

A viewer 301 can view an output of a television 303, which is coupled to an STB 305 and an ad server 307. The STB 305 provides the content of the original broadcast, including audio and video, via a first pipeline 311. The ad to be inserted, including audio and video, is buffered in a second pipeline 313. As noted at 309, content identification may be performed based on audio and/or video, such that a specific content x at a time t is determined (e.g., "what am I watching?"). Once the insertion point of the original video has been reached, the television 303 switches from the first pipeline 311 to the second pipeline 313, and the pre-buffered ad is provided immediately.

FIG. 4 illustrates an example implementation directed to an insertion that uses content identification detection at 400. Similar to the features of FIG. 3, a viewer 401 can receive an output of a television 403, that receives content via a set-top box 405 and an inserted ad via an ad server 407. Additionally, a first pipeline 411 receives the content of the original broadcast including audio and video, and a second pipeline 413 is provided, such that a pre-buffered ad to be inserted is provided immediately upon switching from the first pipeline 411 to the second pipeline 413. Further, channel change detection is performed at 409, based on audio and/or video input from the set-top box 405. If a channel change is detected while the television 403 is rendering an inserted ad from the second pipeline 413, and if it is determined at 415 that the user is not still watching content x, for example, the detected channel change causes the television 403 to switch back to the first pipeline 411 that is rendering the original content.

By having the two pipelines 411, 413, channel change detection may continue to monitor the original video in the first pipeline. If the user changes the channel while the inserted ad is being provided to the viewer, the channel change detection provides a signal for the television to switch back to the first pipeline, thereby stopping the output of the content associated with the second pipeline 413, and restoring the output of the original video of the first pipeline 411.

The foregoing example implementations of FIGS. 3 and 4 may be implemented with various methods of content identification (FIG. 3) and channel change detection (FIG. 4). For example, but not by way of limitation, watermarks may be embedded in the audio, or the video, or a combination of the video and the audio.

As used herein, the term "watermark" refers to a marker that is not visible in the display that is presented to the user, or that is not audible in the audio associated with the video; instead, the watermark is configured to modify the video, the audio, or a combination of the video and the audio, in a manner that can be sensed or detected by a processor that is executing instructions, such as software firmware, or other computer executable instructions. The instructions may implement a watermark detection algorithm without the output of the television providing any indication of the watermark.

For example, but not by way of limitation, the watermarks may encode information such as text, including arbitrary text. As examples of such arbitrary text, the watermarks may encode, for example but not by way of limitation, a content ID of the content, a timestamp, a channel name or other identifier, and identifier associated with a content publisher, information, and ad insertion policy, a description of future ad insertion points for ads, such that the description of the future ad insertion points may include, but is not limited to, for each insertion point, beginning time, and/or end time, and/or duration.

Additional systems and methods of identifying content and detecting channel changes are provided as explained further below according to the example implementations.

Figure 5:
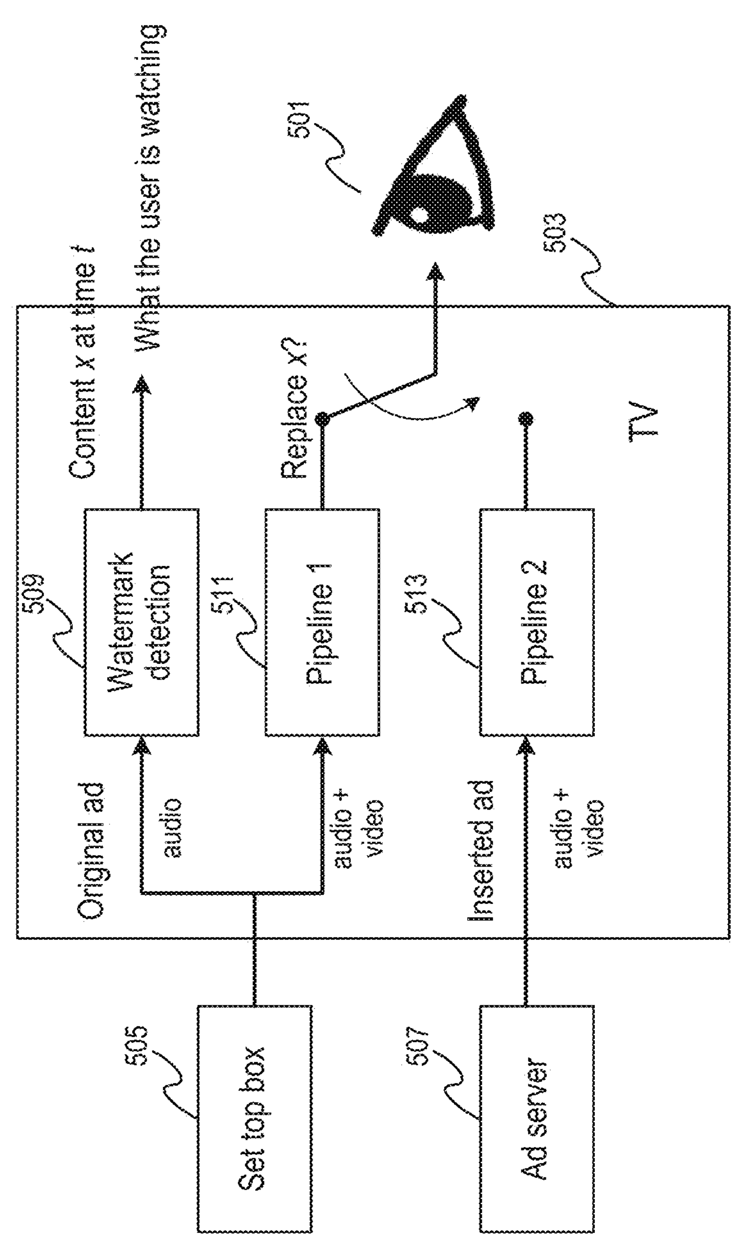
FIGS. 5-6 and 7-8 illustrate various aspects of content identification by use of audio watermarks and channel change detection by use of fingerprinting, respectively, according to the example implementations.
Figure 6:
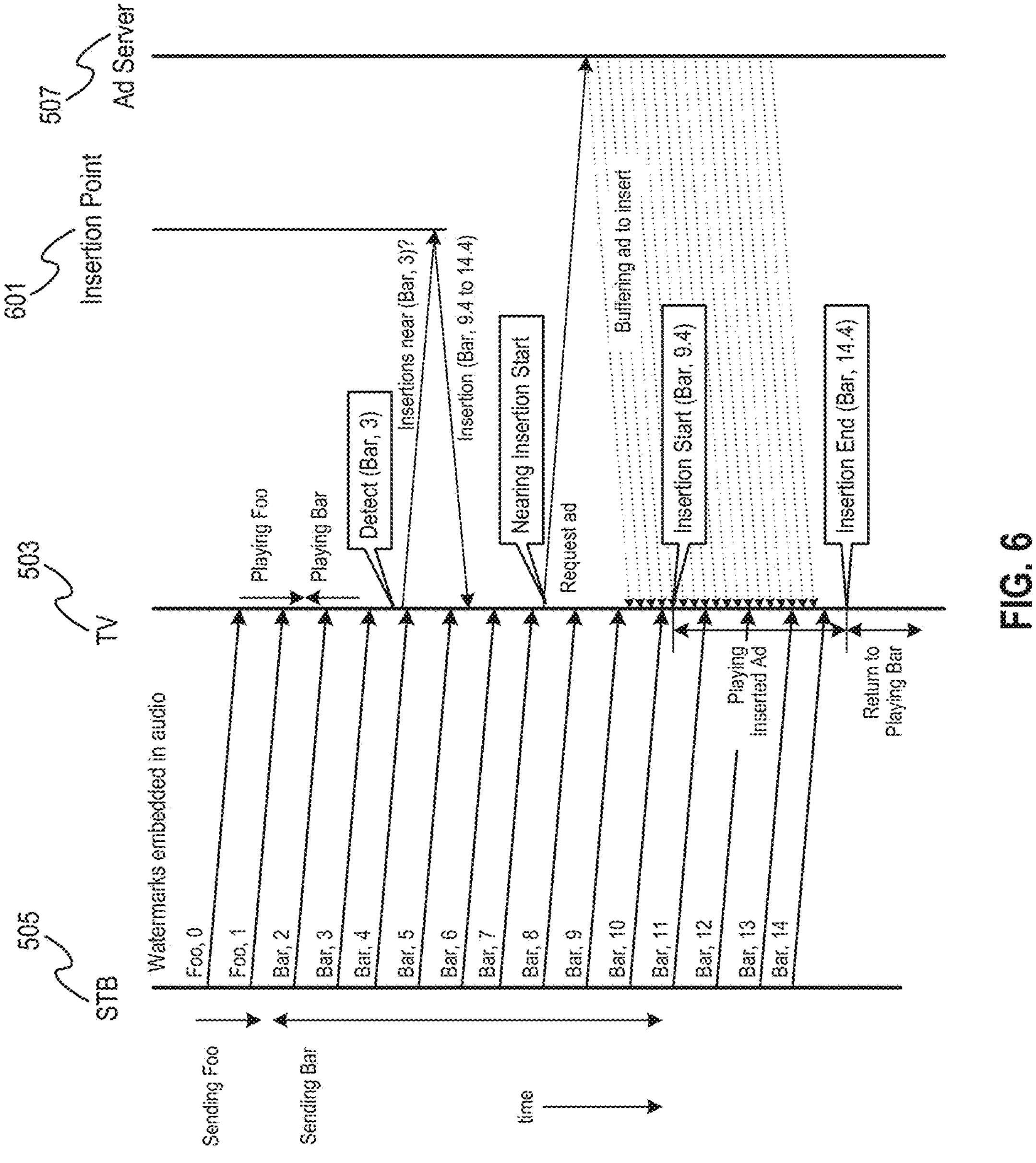
Figure 7:
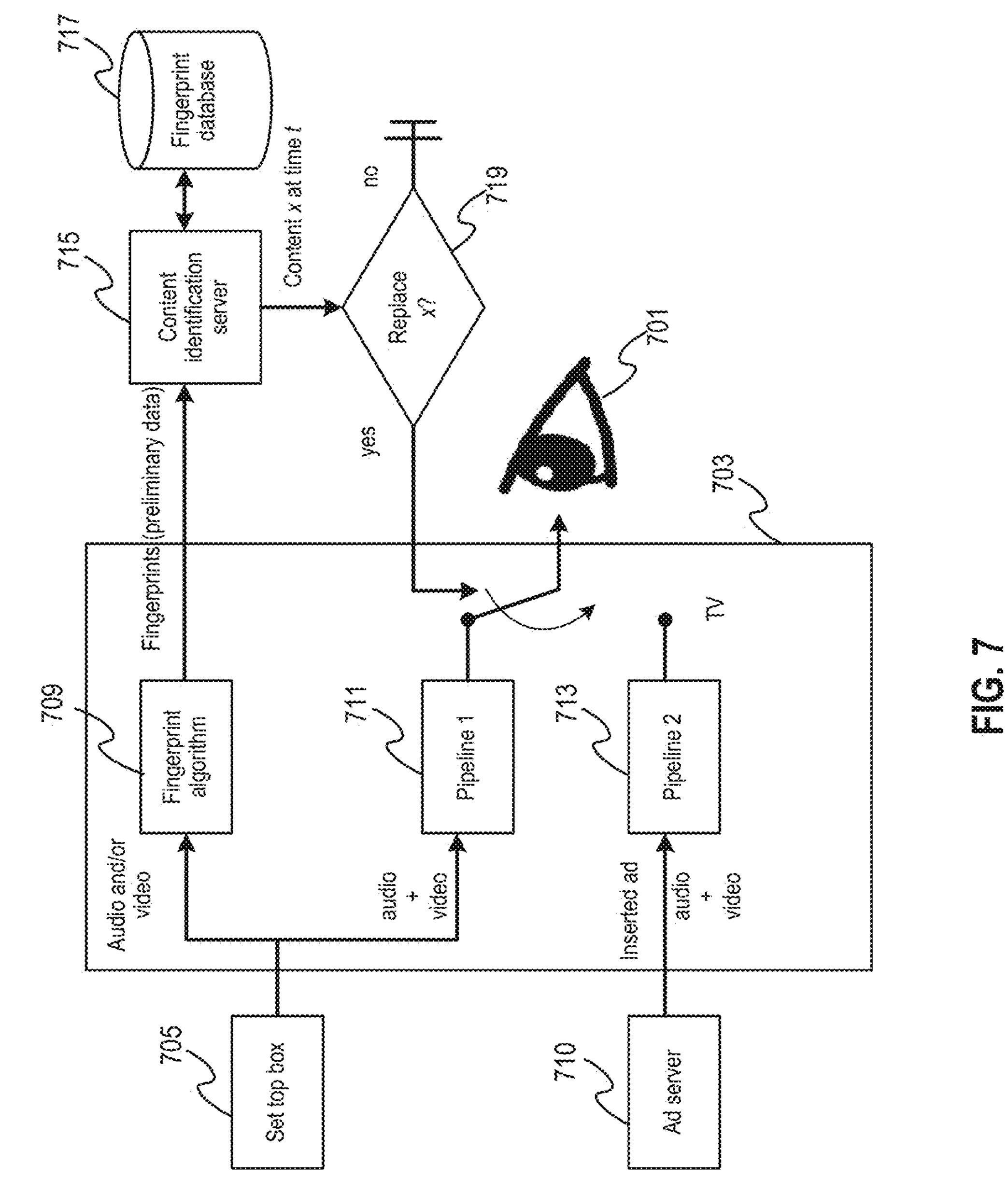
Figure 8:
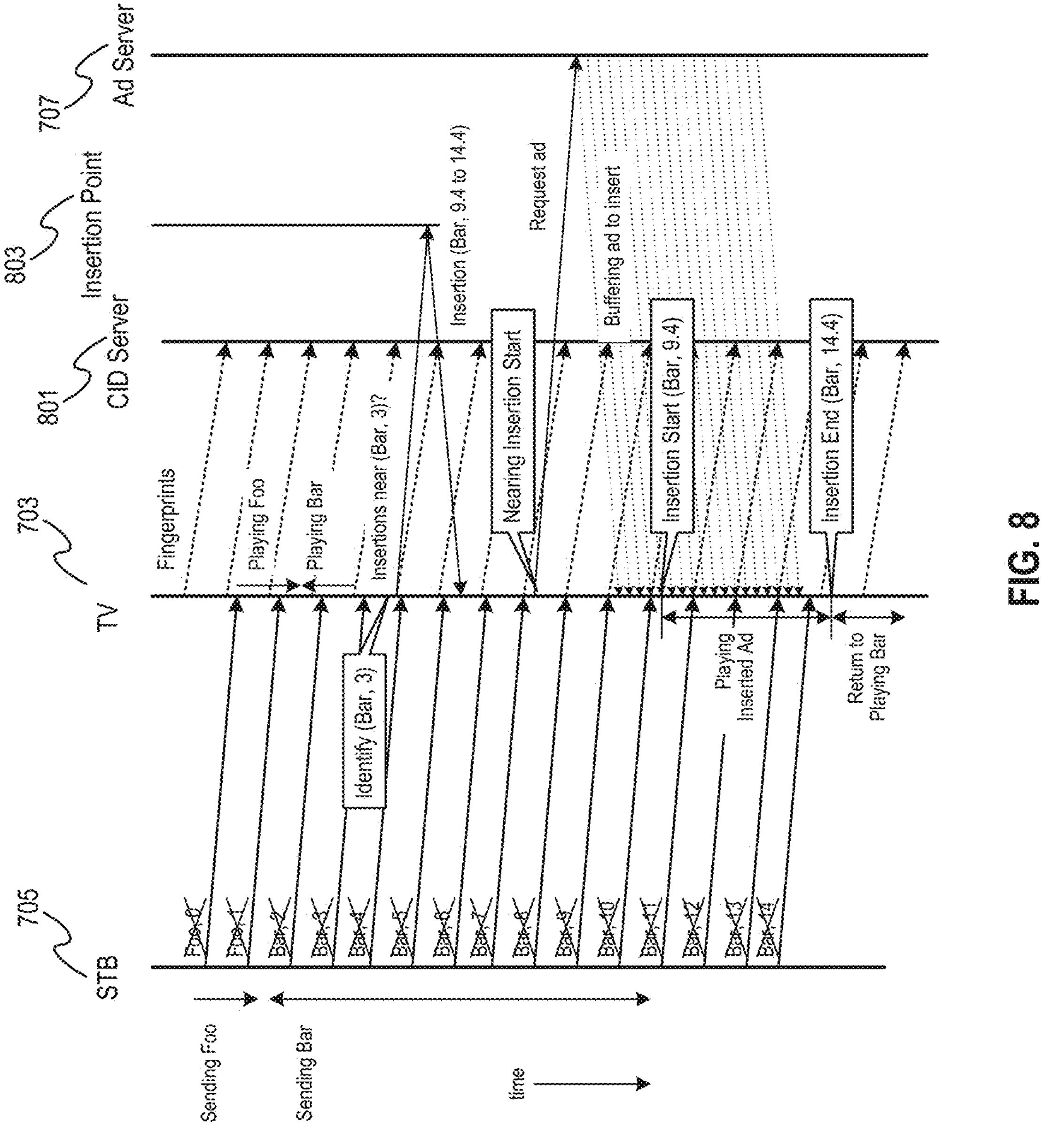

FIGS. 5-6 show content identification using watermarks, and FIGS. 7-8 show content identification using fingerprinting, according to the example implementations.

FIG. 5 illustrates an example implementation of content identification by use of watermarks. More specifically, watermark detection is used to find and extract a watermark, and to use the watermark to identify the content that is being provided to a viewer. While the present disclosure is directed to the use of watermarks for content identification, the example implementations are not limited thereto; the watermarks may be used for channel change detection as well. Further, while watermarks may be illustrated or disclosed as being associated with audio, the example implementations are not limited thereto, and watermarks may appear in video, either together with audio or alone.

At 500, a viewer 501 may be provided with content from a television 503, which in turn receives broadcast content from a STB 505, and ad insertion content from an ad server 507. At 509, based on audio associated with the original content, watermark detection is performed, as explained in greater detail below. As explained above, video watermarks may be substituted for, or used in combination with, audio watermarks. Thus, a determination can be made, for content x at time t, as to what content is being provided to the viewer.

As explained above, the original content, including audio and video, are provided by a first pipeline 511, and the inserted ad, including audio and video is pre-buffered at a second pipeline 513, such that when a determination is made to insert the ad, the pipeline is switched from the first pipeline 511 to the second pipeline 513, as explained above with respect to FIG. 3.

FIG. 6 illustrates, in more detail, use of watermarks to identify content and queries in an insertion point server, to identify insertion points, according to the example implementations. At 600, a timeline between the STB 505, the television 503, and the ad server 507 is provided. At the start of the timeline, the STB 505 is providing content from channel Foo to the television 503. At a prescribed rate, such as once per second, a watermark that is embedded in the audio of the broadcast signal changes, to indicate an increment in time (e.g., Foo, n is indicative of channel Foo at time n). Further, while watermarks may be illustrated or disclosed as being associated with audio, the example implementations are not limited thereto, and watermarks may appear in video, either together with audio or alone.

The television 503 detects the STB 505 at an original content time (e.g., Bar, 3), and provides a query to an insertion point server 601. The insertion point server returns ad insertion start and end times (e.g., Bar, 9.4 to 14.4). As the timeline comes within a prescribed range of the ad insertion start time, which is the insertion point, the television 503 provides a query to the ad server 507, to receive the ad to be inserted, and begins buffering the ad to be inserted, such as at the second pipeline 513.

The prescribed range of time is determined based on the amount of time required to buffer a sufficient portion of the ad, and provide substantially immediate playback once the insertion point has been reached, at the ad insertion start time (e.g., 9.4). At that point, the television 503 switches the output from the first pipeline 511 70 the second pipeline 513 until the insertion end time, and then returns to the first pipeline 511.

According to some example implementations, a requirement may be imposed for the entire ad to be buffered prior to the start of ad insertion. According to the approach, related art buffering error issues may be avoided. For example, but not by way of limitation, if the entire ad is buffered prior to the start of ad insertion, a related art problem of buffering error occurring during the playing of the inserted ad is avoided, due to the ad server not being able to keep up with the playback.

The foregoing example implementation may have various advantages or benefits. For example, but not by way of limitation, the identity of the content may be determined without using fingerprints, and optionally, only by using audio. Further, the watermarks may embed an explicit identifier of the content, which may avoid a need for a fingerprint database, or additional complexity. On the other hand, this example implementation may not detect a set top box user interface and could thus insert an ad on top of the user interface, which may result in an obstruction error (e.g., distortions in the video, such as user interface overlay, while the audio remains unaffected, which may result in an ad insertion that covers the set top box menu). Further, this example implementation may require insertion of the watermarks into the broadcast stream. However, if the watermarks are somehow removed after insertion into the broadcast stream, the content may not be identifiable by the content identification module 309, due to the absence of the watermark. As would be understood by those skilled in the art, the watermarks may be removed for various reasons, including but not limited to preventing unauthorized use by a third party such as a multichannel video programming director (MVPD).

FIG. 7 illustrates an example implementation of the use of fingerprinting for content identification. Similar to FIG. 5 as illustrated above, at 700, a viewer 701 receives an output of a television 703, which is in turn provided with inputs from a STB 705 and an ad server 710. Further, a first pipeline 711, including audio and video provides the original content, and a second pipeline 713 includes a pre-buffered ad, including audio and video. When the television 703 switches from the broadcast content to the inserted ad at an insertion point, the output is switched from the first pipeline 711 to the second pipeline 713.

Additionally, an output of the STB 705 is provided as audio and/or video to a fingerprint detection algorithm 709. The fingerprint algorithm 709 can compute fingerprints from audio, video or a combination thereof. For example, but not by way of limitation, as explained above, the watermarks may be removed prior to the broadcast signal arriving at the STB 705, such that watermarks cannot alone detect an identity of the content. For example, a content identification server 715 is provided, that receives fingerprints generated by the fingerprint algorithm 709, as well as a fingerprint database 717.

Based on a match in the content identification server 715, a determination of the content x time t is provided. At 719, a determination is made as to whether the content is to be replaced, such as by the inserted ad, at an insertion point. The resulting signal is provided to the television 703, and may be used to switch between the first pipeline 711 that includes the original content, and the second pipeline 713, that includes the pre-buffered inserted ad, received from an ad server 710. Additional details of operation of the example implementation including fingerprinting are provided as explained below.

FIG. 8 illustrates, in more detail, use of fingerprints to identify content and queries in an insertion point server, to identify insertion points, according to the example implementations. At 800, a timeline between the STB 705, the television 703, and the ad server 707 is provided. At the start of the timeline, the STB 705 is providing content from channel Foo to the television 703. As illustrated in FIG. 8, the watermark is not present, or may have been removed.

Accordingly, the television 703 receives the signals from the STB 705, and generates fingerprints, which are provided to a content identification (CID) server 801. The CID server 801 compares the received fingerprints from the television 703 to information in the fingerprint database 717, to check for a match. With each fingerprint that is processed, a degree of confidence is determined with respect to an identity of the content.

When the channel is changed from Foo to Bar, and after the television 703 has provided fingerprints to the CID server 801, the CID server 801 matches the fingerprints from the television 703 with information in the fingerprint database 717 that indicates that the television 703 is receiving content from the STB 705 associated with channel Bar, and provides the television 703 with such an indication.

As the timeline comes within a prescribed range of the ad insertion start time, which is the insertion point, the television 703 provides a query to the ad server 707, to receive the ad to be inserted, and begins buffering the ad to be inserted, such as at the second pipeline 713. The prescribed range of time is determined based on an amount of time required to buffer a sufficient portion of the ad, provide substantially immediate playback once the insertion point has been reached, at the ad insertion start time (e.g., 9.4). At that point, the television 703 switch is the output from the first pipeline 711 to the second pipeline 713 until the insertion end time, and then returns to the first pipeline 711.

The foregoing example implementation may have various benefits and/or advantages. For example, but not by way of limitation, fingerprints are generated at the television, whereas watermarks are generated upstream of the television receiving the signal and may be removed (e.g., during production or distribution, such as the MVPD the removing the watermark). For example, it may be necessary to analyze several frames or video, or several seconds of audio, in order to decode the watermark, thus resulting in delay. On the other hand, fingerprints require the performing of matching, and may thus may have a slower identification time or require additional servers or processing power, which may be associated with insertion over wrong content or delayed channel change.

FIG. 9 illustrates aspects associated with the introduction of an insertion point identification algorithm in the television, according to the example implementations. More specifically, the insertion point identification algorithm inside the television monitors fingerprints that are output from the fingerprint algorithm, such that when a piece of content is identified, the television queries a server to obtain the trigger fingerprints for the content, and when a sequence of trigger fingerprints is received in the output of the fingerprint algorithm, the insertion point identification algorithm generates an inference that the ad insertion point of the broadcast stream has been reached, or is about to be reached.

At 900, a viewer 901 receives an output of a television 903, which in turn receives inputs from a set-top box 905 and an ad server 907 respectively. As discussed above in FIG. 7, a fingerprint algorithm 909 is provided, and a first pipeline 911 provides the original broadcast content, and a second pipeline 913 includes the pre-buffered ad insertion content, switchable by the television 903 as explained above.

Similar to FIG. 7, the television 903 generates by way of the fingerprint algorithm 909, fingerprints associated with audio and/or video of the original broadcast content. A content identification server 915 receives the fingerprints (e.g., preliminary data) from the fingerprint algorithm 909, and performs a comparison with a fingerprint database 917 to determine the existence of a match. Over the processing of fingerprints, the content identification server 915 develops a degree of confidence as to the presence of content x at time t. Accordingly, the content identification (e.g., primary data) is generated from the fingerprints (e.g., preliminary data) by the content identification server.

Additionally, an insertion point may be identified based on a sequence of trigger fingerprints. More specifically, once the content identification server 915 identifies the content based on the fingerprints generated by fingerprint algorithm 909 at the television 903, an insertion point server 921 is provided, that finds insertion points within the content x, by reference to an insertion point database 919.

The insertion point server 921 sends the insertion points to the television 903. An insertion point algorithm 923 at the television 903 monitors the fingerprints provided by the fingerprint algorithm 909. For the trigger fingerprints from the insertion point server 921 matching fingerprints generated by the fingerprint algorithm 909, a determination is made with respect to whether the trigger fingerprints are found; if so, a signal is provided so that the television 903 switches between the first pipeline 911 and the second pipeline 913.

Audio or video distortions (e.g., noise) in the distribution path may prevent accurate detection of a fingerprint match, even when approaching the insertion point. Accordingly, the insertion point identification algorithm 923 may provide a statistical test to identify insertion points with high precision, even in the presence of such noise. Accordingly, when an insertion point arises, the insertion point identification algorithm 923 triggers the television 903 to switch between the first pipeline 911 and the second pipeline 913, so that the television 903 displays the inserted ad.

The foregoing example implementation may have various benefits and advantages. For example, but not by way of limitation, trigger fingerprints may allow for more accurate detection of the insertion point, which may in turn reduce original ad truncation and insertion over wrong content.

Figure 10:
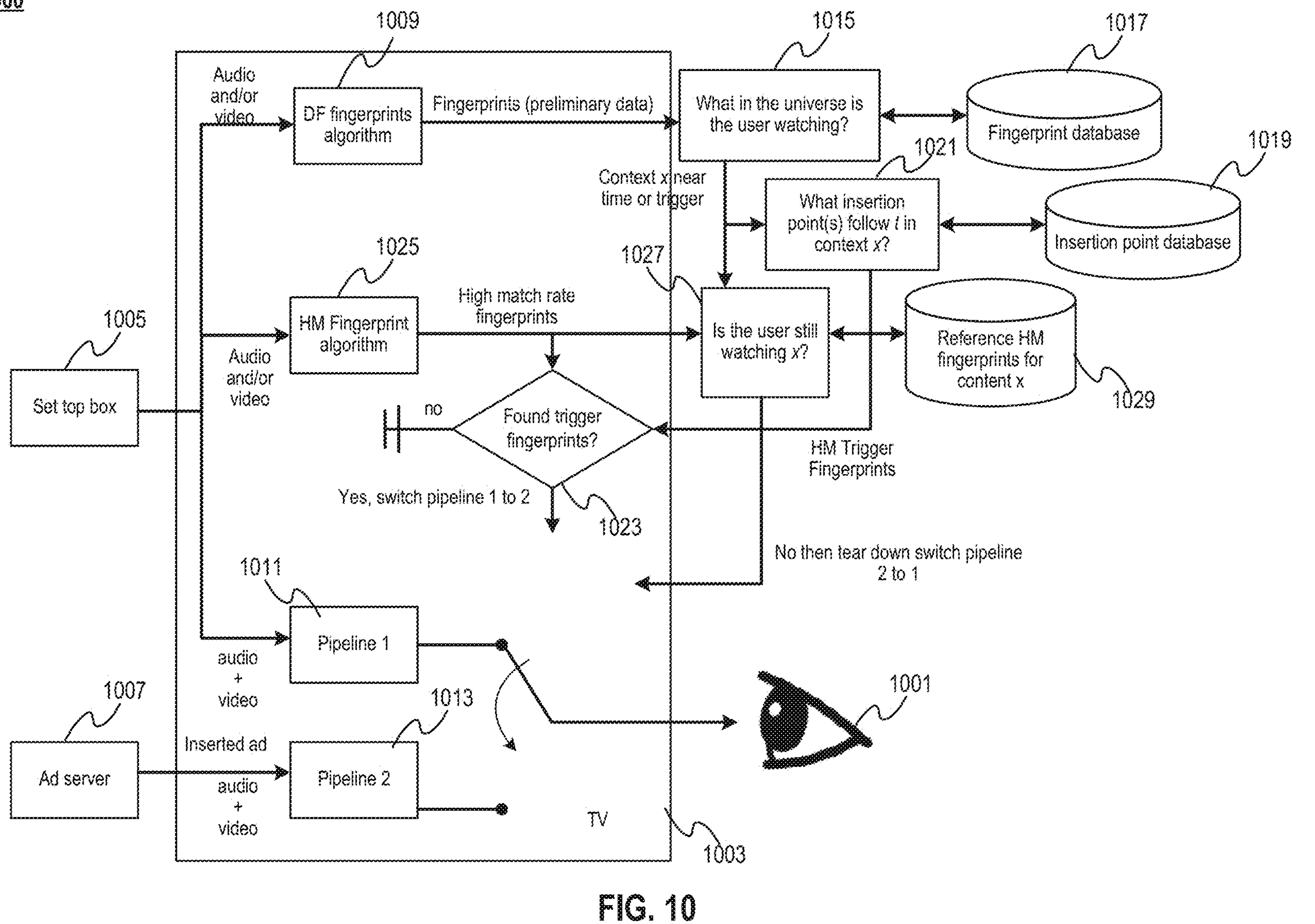
FIG. 10 illustrates an example implementation associated with content identification and channel change detection.

FIG. 10 illustrates an example implementation associated with content identification and channel change detection.

At 1000, a viewer 1001 receives an output from a television 1003, which in turn receives inputs of original content from the STB 1005, as well as ad insertion information from the ad server 1007. As explained above with respect to FIG. 9, a fingerprint algorithm 1009 is provided, and a first pipeline 1011 and a second pipeline 1013 are provided, with the first pipeline 1011 including the original broadcast content and the second pipeline 1013 including a pre-buffered ad to be inserted.

Further, and also as disclosed above with respect to FIG. 9, a content identification server 1015 receives the fingerprints generated by the fingerprint algorithm 1009, and performs a comparison for a match with respect to the fingerprint database 1017. An insertion point server 1021 receives an output of the content identification server 1015, indicative of the content that the viewer is viewing. The insertion point server 1021 accesses the insertion point database 1019 to determine the insertion points that follow in the content that the viewer is viewing. The insertion point identification algorithm 1023 receives an output of the insertion point server 1021 including trigger fingerprints.

Additionally, another fingerprint algorithm 1025 is provided in the television 1003, which is a high match rate fingerprint algorithm. Whereas the fingerprint algorithm 1009 is a differentiating fingerprint algorithm, directed to distinguishing fine details between two pieces of content and mapping fingerprints onto content matches, the insertion point database 1019 also includes a list of high match rate fingerprints that are preceding and/or at the insertion point at 1029. This list may include an identification of the content as the primary index, and time in the reference content as a secondary index. The stored values containing the reference high match rate fingerprints for the content include the timestamps that correspond to the matching times within the content.

It should be understood that the high match rate fingerprint algorithm 1025 may match the high match rate fingerprints at a faster rate than differentiating fingerprint algorithm 1009 can match differentiating fingerprints, to more quickly determine a change in content (e.g., representing a channel change or activation of an overlay). In other words, the high match rate fingerprint algorithm 1025 may sacrifice accuracy, relative to the differentiating fingerprint algorithm 1009, in order to improve the speed by which the television 1003 can detect changes in content. Conversely, the differentiating fingerprint algorithm 1009 may sacrifice speed, relative to the high match rate fingerprint algorithm 1025, in order to improve the accuracy with which the television 1003 can identify content in the first place.

When the insertion point identification algorithm 1023 determines that the trigger fingerprints are found in a received input of fingerprints, the high match rate fingerprints from the high match rate fingerprint algorithm 1025 and the high match rate trigger fingerprints from the insertion point server 1021 are provided to the insertion point identification algorithm 1023, which makes a determination to switch between the first pipeline 1011 and the second pipeline 1013.

When a channel change occurs, both differentiating fingerprints and high match rate fingerprints may miss a detection. This is because differentiating fingerprints are more sensitive to noise, and may not match, even when the user has not changed the channel. On the other hand, some differentiating fingerprints may match, and may be sufficiently differentiating to distinguish the content that is being provided to the user from the universe of content. Because differentiating fingerprints are so fragile, they may generate false detections of channel changes when noise is introduced into the video stream.

For example, but not by way of limitation, a video may be received by the television 1003 in a distorted form. In this situation, many of the differentiating fingerprints will not match the fingerprint database 1017, due to distortion, as explained in greater detail below.

For fingerprint algorithms, the percentage of fingerprints that match to those in the fingerprint database may vary dramatically over time, even within a single content. For example, a video may have a dark scene with very little information, or a video may have been intentionally enhanced by the set top box, such that the colorspace differs. Regardless of the cause of the distortion, scenes with low match rates may cause the system to lose confidence in what the user is watching, such that ad insertions cannot occur.

According to one example implementation, a fingerprint algorithm with a higher match rate may be used to answer both "what in the universe is the user watching?" and "is the user still watching X?", although these two questions are very different. Achieving higher match rates may imply less differentiating power.

Addressing the question of "what in the universe is the user watching?" requires differentiating power. However, for the question "Is the user still watching X?" the universe of fingerprints may be constrained to the single piece of content X, around a time immediately after the last confirmation that the user was watching X. If it is known that the user was watching X at time t, the probability of encountering video 1 second later that looks like X is very high. Conversely, the probability the user switches to content other than X but that appears like X is small.

Accordingly, the fingerprints for matching to X do not require as much differentiating power. Thus, a fingerprint algorithm can be used that sacrifices differentiating power for higher match rate. Using a higher match rate algorithm, then the system can more easily answer the question "is the user still watching X?"

In a situation where the identity of content x is known, the system may determine whether the user is still watching content x (e.g., given that the user was determined to be watching content x, if the fingerprints continue to match content x, what is the probability that the user is still watching content x?). To make this determination, the fingerprints from the television may be matched against the fingerprints for content x. If differentiating fingerprints are used, and noise is introduced, the differentiating fingerprints may miss the content determination, because the differentiating fingerprints are too fragile (e.g., differentiating power may be suited to answering "what in the universe is the user watching?"), and may thus cause the problem of false positive detections of channel changes.

Once the content has been identified ("what in the universe is the user watching?"), and to focus on answering "is the user still watching X?", the high match rate fingerprints are substantially found in the list of high match rate fingerprints 1029, due to the high match rate. Accordingly, when a viewer 1001 changes the channel, the new channel has fingerprints that are so different that even the high match rate fingerprints no longer match. Accordingly, because the high match rate fingerprints are likely to match when the content has not changed, the increase in the nonmatching of the high match rate fingerprints is a strong indicator of a change of channel. Accordingly, at 1027, a comparison between the high match rate fingerprints from the high match rate fingerprint algorithm 1025 is referenced in the list of high match rate fingerprints associated with the original content at 1029, and if there is a match, then it is determined that the viewer is still being provided with the same content ("is the user still watching X?"), and the channel has not been changed.

According to one example implementation, only differentiating fingerprints may be used without high match rate fingerprints, with a primary focus on determining "what in the universe is the user watching". Accordingly, when a viewer changes channels during an inserted ad, the television 1003 tears down the inserted ad to show the new channel. According to this example implementation, the result is the same as in FIG. 9, except that the differentiating fingerprint algorithm 1009 is used instead of the fingerprint algorithm 909. According to one example implementation, a quick teardown of the inserted ad on channel change may be achieved by determining that teardown should be performed after a prescribed number of consecutive nonmatching differentiating fingerprints at 1015. However, as explained above, differentiating fingerprints are very sensitive to distortions, such as the introduction of noise, and are directed to determining "what in the universe is the user watching?" more than "is the user still watching X?". Thus, if the differentiating fingerprints provide a false positive detection of channel change, there is a risk of incorrect teardown error.

A variation of the foregoing example implementation only uses differentiating fingerprints, a certain set of fingerprints, such as solid black or near black, or a fingerprint that appears as a channel change user interface. More specifically, on many set-top boxes, when a user changes the channel, one or more seconds may be required for a television to begin displaying the new channel. During this transition time, most of the frame is either black or near black, except possibly along a single edge, which may display a channel change user interface. Such fingerprints, also referred to as "special fingerprints" (e.g., fingerprints corresponding to black or near-black frames, or other frames that are indicative of a channel change), may be used. More specifically, a channel change may be rapidly detected without requiring high match rate fingerprints.

For example, if the channel change detector encounters the special fingerprints, and the same special fingerprints are not present in content X at or near the same playback time, the channel change detector may rapidly determine that there has been a channel change. This example implementation may provide for relatively fast channel change detections except when the television itself performs a channel change, without introducing any video that results in the fingerprints corresponding to solid black or near-black fingerprints. On the other hand, if black or near black screens do not appear in the video input to the TV from STB 1005, this variation may not detect transition behaviors, and may result in delayed channel change errors. Moreover, black frames may occur naturally in dark scenes, and during some scene transitions within the content. Such black frames or other frames may result in special fingerprints, which could in turn cause drag or delayed channel change detection errors.

According to another example implementation, and as explained above, the high match rate fingerprints may be used once an identity of the content x has been determined at 1015. The high match rate fingerprints may be used to confirm that the content x has not changed, or that the viewer is still being provided with content x. While the high match rate fingerprints may be too coarse to differentiate between similar content, they will be able to detect a channel change.

This example implementation has various benefits and advantages. For example, but not by way of limitation, although high match rate fingerprints may be too coarse to differentiate between similar content, they do not have the problems and disadvantages of differentiating fingerprints (e.g., noise) as explained above. Moreover, because channel change detection does not require detection between highly similar content (e.g., the content on different channels would typically not be very similar), the high match rate fingerprints are sufficiently different that the high match rate fingerprints will correctly indicate an absence of content x. As a result, an inserted ad will be torn down in response to a number of high match rate comparisons misses above a prescribed level. Accordingly, an example implementation as described herein will have a substantially small rate of incorrect teardown (e.g., fewer incorrect teardown errors).

According to a variation of the foregoing example implementation, a set-top box may have more than one tuner. Accordingly, one tuner may be tuned to the current channel, and the other tuner may tune to the likely next channel that the user would encounter while changing channels. For example, if the set-top box has already tuned to the next channel when the user indicates a change of channel, the television may receive few or no black frames between the channels, such that no frames generate special fingerprints, and the transition may not be usable as an indicator of a channel change. In combination with plural tuner example implementation, and as explained above, a set of fingerprints may be integrated that could allow quick channel change detection when there is a period of black frames, for additional robustness, and a reduction in the frequency of delayed channel change errors.

The foregoing example implementation may have various benefits and/or advantages. For example, but not by way of limitation, the foregoing example implementation may decrease content identification time. Further the foregoing example implementation may decrease drag as well. This may be accomplished by separating content identification and channel change detection, and implementing separate fingerprint algorithms. Further, teardowns may be faster, and a lower frequency of delayed channel change errors may occur, where differentiating fingerprints and high match rate fingerprints are used in combination, as explained above.

Figure 11:
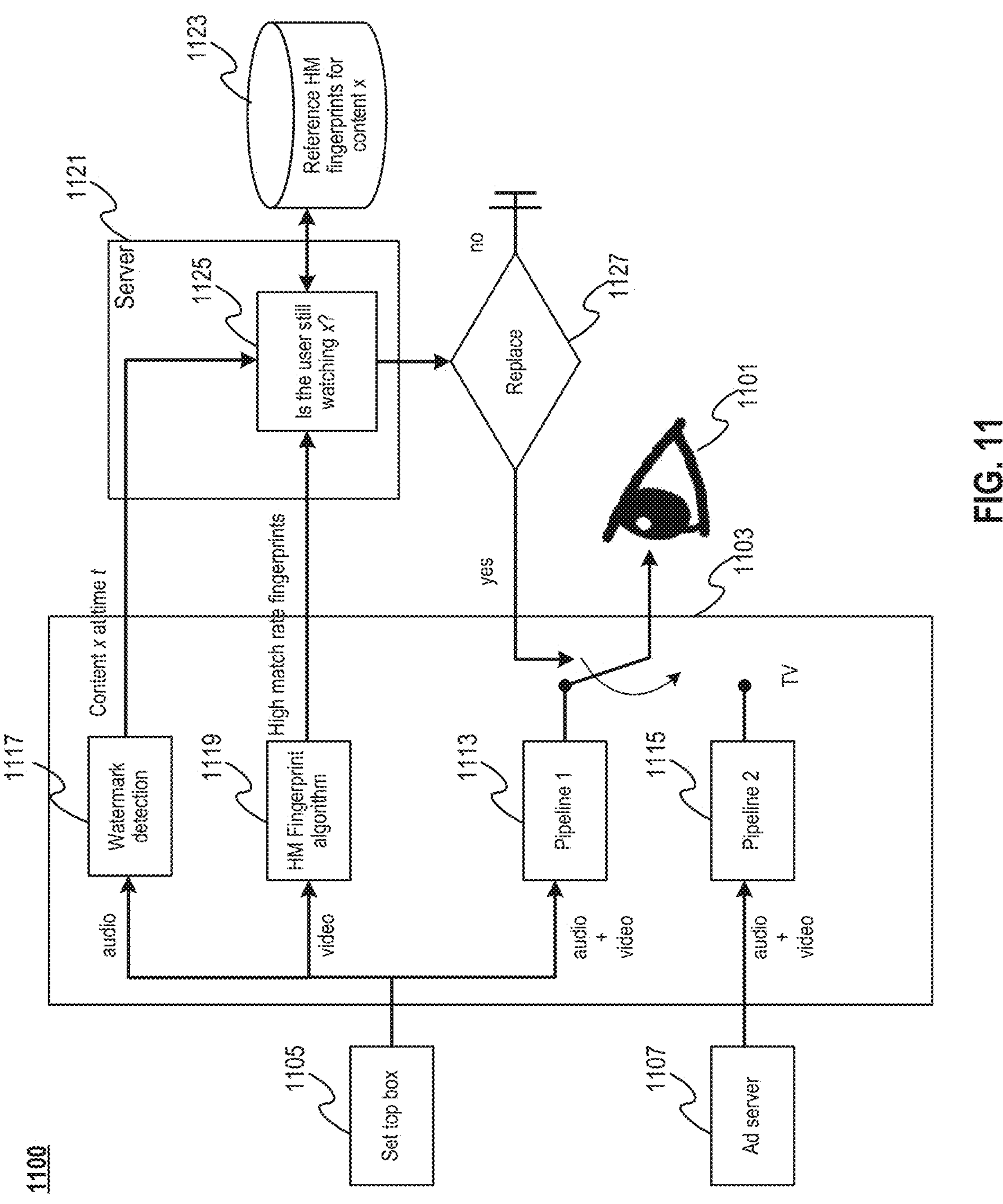
FIG. 11 illustrates an example implementation that includes watermark detection and a high match rate fingerprint algorithm.

FIG. 11 illustrates an example implementation that includes watermark detection and a high match rate fingerprint algorithm. More specifically, watermarks are used to determine content (e.g., using audio only), and high match rate algorithms are used to determine whether content has been changed, such as a channel change (e.g., using video only).

At 1100, a viewer 1101 is provided with an output of a television 1103, which receives signals associated with the original broadcast content from a STB 1105, and an ad server 1107, associated with an ad to be inserted in the original broadcast content. As explained above, a first pipeline 1113 and a second pipeline 1115 are provided, with the first pipeline 1113 having the original broadcast content, and the second pipeline 1115 having the pre-buffered ad to be inserted. The television 1103 switches between the first pipeline 1113 and the second pipeline 1115.

At 1117, an audio signal from the set-top box is provided for watermark detection to determine content x at time t, as explained above. Alternatively, this example implementation may employ video watermarks, either in combination with or instead of audio watermarks. An output of 1117 is provided to a server 1121. At 1119, a high match rate fingerprint algorithm detects and outputs high match rate fingerprints, as explained above. The high match rate fingerprints are provided to the server 1121. At 1125, the high match rate fingerprints of the high match rate fingerprint algorithm 1119, the identity of the content as determined by the watermark detection 1117, and the reference high match rate fingerprint database 1123 are compared to determine if the content has changed. If it is determined that the content has not changed and output is provided to 1127, that is indicative of whether an insertion point has been reached. If the insertion point has been reached, instruction is provided to the television 1103 to switch between the first pipeline 1113 and the second pipeline 1115, so as to provide insertion of the ad, for example.

According to this example implementation, watermarks may be used to substitute for the fingerprints. For example, but not by way of limitation, if the watermarks are updated only every few seconds in the audio or the video, that occurrence of the fingerprints from the audio or video of the set-top box not matching the reference fingerprints could be used, for a given content, to rapidly detect channel changes.

Figure 12:
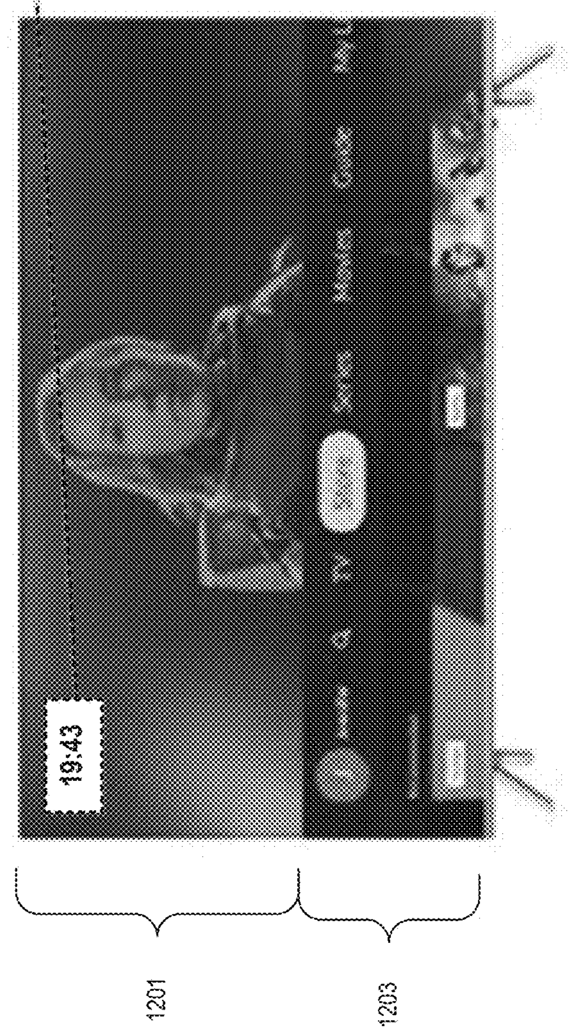
FIGS. 12-13 illustrate related art overlays.

Additionally, the overlay may include detected user interface elements, as explained herein. FIG. 12 illustrates an example scenario of overlay user interface elements at 1200. More specifically, a program of content 1201, such as a television program is provided, along with a navigation bar 1203, which is an overlay menu. In this example, the overlay menu occupies a portion of the frame, here, the bottom third of the frame. Further, other overlay content, such as a timestamp 1205, may appear at other positions on the screen, such as the upper left corner in this example. Here, the menu 1203 and the timestamp 1205, may be provided by the set-top box and/or satellite transmission.

Figure 13:
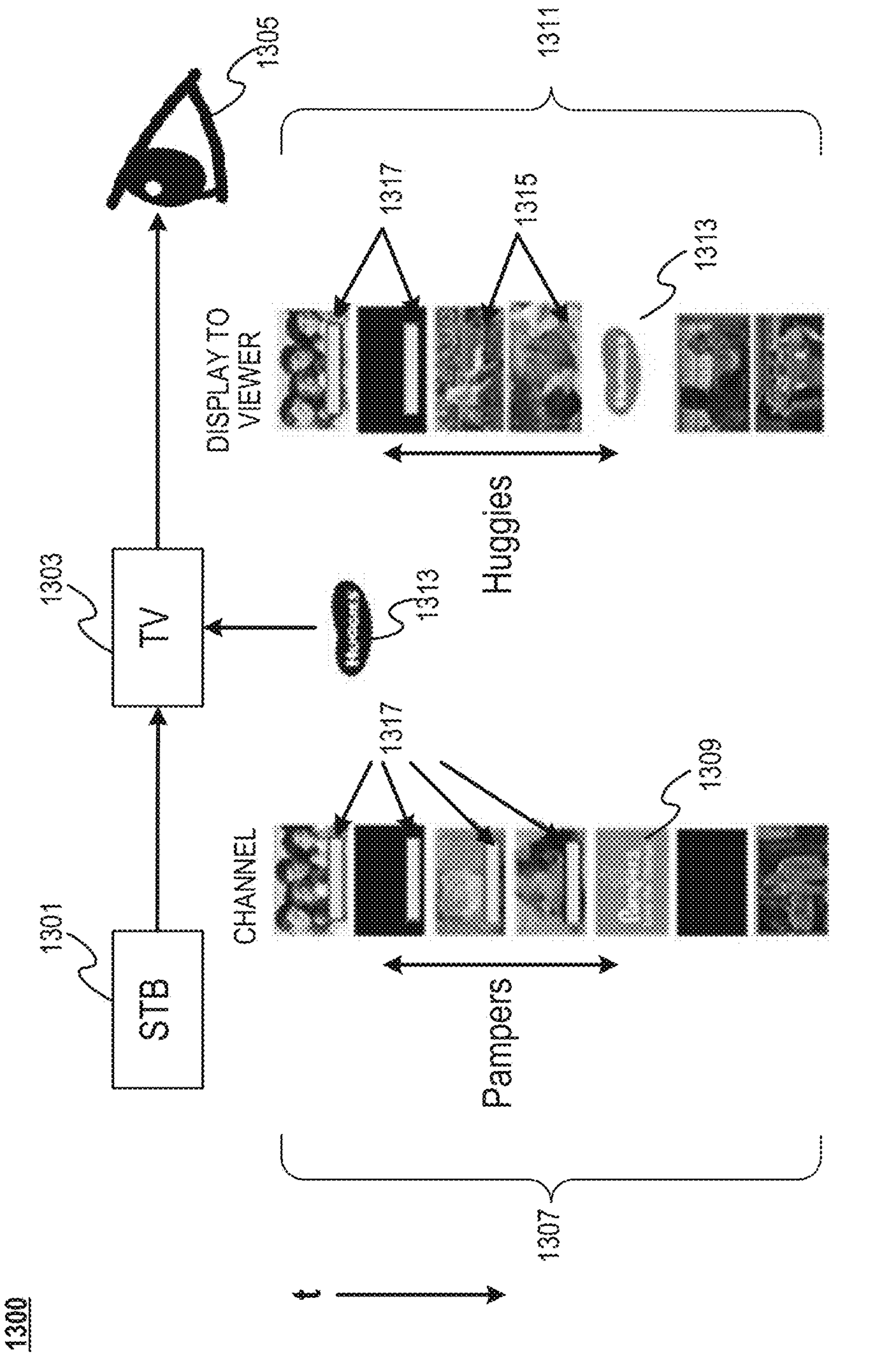

FIG. 13 illustrates a related art obstruction of the user interface in 1300. More specifically, a set-top box 1301 provides information to a television 1303, which provides an output to a user 1305. The set-top box 1301 provides a broadcast 1307, including a first advertisement 1309. The television 1303 replaces the first advertisement 1309 with a second advertisement 1313. Thus, the viewer 1305 views the broadcast 1311, which includes the dynamically inserted ad 1313.

In this situation, the user may, by his or her remote control, provide an indication to the set-top box 1301 to activate an overlay menu. In this example the overlay menu may provide an indication to display "Channel Foo". As the user is still being provided with the menu when the display of ad occurs, the set-top box 1301 continues to display the overlay menu on top of the ad 1309; however, the television 1303 replaces the ad 1309 with the ad 1313. Accordingly, the ad 1313 provided by the television 1303 may obstruct the menu, for example 1203 as described above. Such an overlay obstruction is considered to be disadvantageous, and the resulting user experience may be deemed unacceptable.

In the user experience, a user interface element may be provided, which includes metadata that may be presented to the user about a program the user is watching, provide the user with identifying information such as the channel the user is watching, provide decision-support information such as an electronic programming guide, or other information that may be useful for the user, as would be understood by those skilled in the art. Related art set-top boxes do not provide the television with a signal indicative of a user interface being displayed in the video that the related art set-top box is providing to the television. Accordingly, if the television does not receive any indication of the presence of an overlay, a dynamic ad insertion performed by the television may provide a replacement for the ad provided by the set-top box, with the inserted ad not including the overlay. Accordingly, the related art problem of an obstructed user interface, as discussed above may occur.

Example implementations are provided that include an overlay detection algorithm. More specifically, the overlay detection algorithm is directed to determining whether an overlaying user interface element appears in a frame at a given time (e.g., "Is there an overlaying user interface element in the frame appearing at time t?"). The example implementations include a detection scheme that classifies frames into various classes (e.g., overlay present, and overlay not present).

At least one aspect is directed to dynamic ad insertion (DAI) that does not interfere with overlays or other on-screen elements, such as STB menus. According to the content identification (CID) approaches, including but not limited to automatic content recognition (ACR), the system provides an indication that an event has occurred (e.g., channel change and/or presence of overlay) that would interfere with DAI. In other words, the appearance of an overlay on the broadcast video prevents DAI when the overlay covers all or most of the screen. As described in greater detail below, an example approach is provided to determine the presence of the channel change and/or overlay, as well as whether to perform DAI.

The approaches described herein may prevent DAI in cases where the overlay only covers a portion of the viewing region or screen. In other words, to account for the situation where the overlay covers a portion, but not all, of the screen, undesirable ad replacement can be prevented by use of the approaches described herein.

To implement the foregoing example implementations, a method of detecting overlays is provided. More specifically, fingerprinting is performed on regions of the screen. A sequence matching approach is provided to provide a confidence score that is indicative of the presence of a piece of content, based on whether one or more of the regions match the content. More specifically, if one or more of the regions consistently fail to match content in the fingerprint database, this may be indicative of an overlay on the screen by the STB.

According to some example implementations, a determination of an overlay is made based on the matching approach indicating that at least a prescribed number of regions (e.g., two regions) on a side of a screen do not match content in the fingerprint database. Such a determination is indicative of the possible presence of an overlay. This approach is robust with respect to noise (e.g., the overlay detection will not result in a false detection of the presence of an overlay, for the situation where the noise only impacts a portion or a region of the display), while still being able to detect a presence of an overlay that spans one or more sides of the screen.

In yet another example approach, fingerprint matching is not used to provide an indication of the presence of an overlay. Instead, the presence of an overlay is determined based on one or more regions having consistently low spatial and/or temporal information, when the content itself does not contain low spatial and/or temporal information. For example but not by way of limitation, if a solid color is determined to be present on a side of the screen in a situation where the broadcast content does not have any solid color, this result may be indicative of an overlay such as an STB menu being present.

Therefore, the example implementations only perform ad insertion when the results of the matching operation is indicative of an overlay not being present on the screen.

More specifically, according to this example implementation and overlay may be determined to be present for the situation where a percentage of frames that have been detected and contain an overlay. Further, precision may be measured as a percentage of frames for which the detector has determined that there is an overlay, as compared with the actual existence of an overlay on the output displayed to the user. For example, but not by way of limitation, if a detection algorithm has 100% recall, in other words, the detection algorithm detects an overlay for each frame that contains an overlay, it is possible that the detection algorithm may falsely detect overlays in frames that do not actually contain overlays. Further, if the detection algorithm has 100% precision, then for each frame in which the algorithm detects an overlay, there is actually an overlay present in the display provided to the user. However, 100% precision still allows for a possibility of failure to detect overlays in frames that contain overlays. Accordingly, there may be a trade-off between recall and precision. For example, but not by way of limitation, a first classifier may be preferable to a second classifier, if the first classifier has both higher recall and higher precision than the second classifier. If, for example, an overlay is obstructed by and inserted ad, and this scenario represents an unacceptable user outcome, then it may be preferable to provide an overlay detection algorithm that is biased toward high recall. As a result, detectors that provide mitigation of the obstructed user interface related art problem may be biased toward declaring the presence of an overlay when an overlay is not actually present, as opposed to not detecting the presence of an overlay when an overlay is present.

Example implementations that use audio watermarking for dynamic ad insertion do not address the related art obstructed user interface problem. In this example implementation, the presence of an overlay user interface element obstructs some of the video, but the overlay does not impact the watermarks that are embedded in the audio. Thus, if DAI determinations are only based on audio watermarking, the DAI of the television would not determine whether an overlay user interface is present, and thus, the DAI of the TV would replace an ad, even if the user interface is present.

Similarly, because audio is not affected by a video obstruction or overlay, approaches that employ only audio fingerprinting do not address the related art obstructed user interface problems.

Other approaches may involve use of video watermarks. More specifically, and overlay in a video may obstruct a video watermark. Thus, if the television can no longer detect the video watermark due to the presence of an overlay, and the DAI approach involves a rule to not insert an advertisement if the content is not recognized, then video watermark approaches as described herein may resolve the obstructed user interface related art problem. Further, if the video watermark is made robust to noise, the video watermark may survive distortion that is introduced by the overlay menu, and thus, the presence of the overlay user interface element may continue to be undetected. As a result, the obstructed user interface related art problem may recur.

Accordingly, with the video watermark example implementation, a trade-off exists. On one hand, the watermark algorithm may be sensitive to distortion, and an opportunity for ad insertion may be lost if the sensitivity to distortion causes the watermark to go undetected when there is actually no overlay user interface element being displayed. On the other hand, the watermark algorithm may be so robust to distortion that the distortion introduced by a user interface element may not be detected, thus risking the related art obstructed user interface problem. Further, video watermark approaches may not identify locations of overlays on the display; accordingly, it may not be possible to simply insert the ad in the portion of the display that does not include the overlay. Additionally, if the watermarks are removed by the set-top box or another entity in the video distribution path, then the television cannot perform overlay detection.

Another related art approach may employ multiple independent video watermarks for a frame. According to these embodiments, the screen is segmented into regions. For example, the regions may form a grid. One video watermark may be placed in each of the regions. Optionally, the watermark of each of the regions may be encoded and decoded independently of the watermarks in the other regions. Thus, visual distortion that is in a particular region of the display may not affect decoding of the watermarks in other regions.

Figure 14:
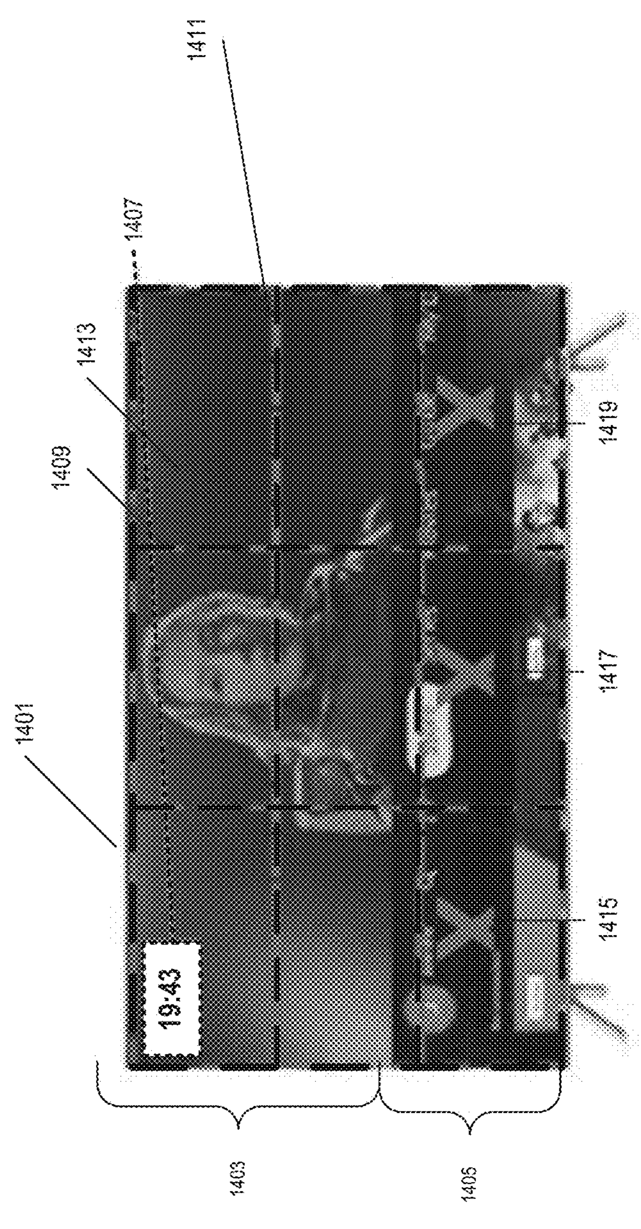
FIGS. 14-15 illustrate an example implementations that includes overlay detection associated with dynamic ad insertion according to one or more example implementations.
Figure 14:

This example implementation employing multiple independent video watermarks per frame is illustrated in FIG. 14. As shown at 1400, a television display 1401 includes a portion showing the broadcast stream 1403 and a portion 1405 that is an overlay that includes a navigation bar. Similarly, a time indicator 1407 is provided on another portion of the television display 1401. Further, a grid comprising a series of intersecting lines 1409 and 1411 to form regions 1411 is provided.

As can be seen in FIG. 14, overlay user interface elements may appear along an edge, such as navigation bar 1405, or in a corner, such as time indicator 1407. When a watermark fails to properly decode the existence of the overlay, this may be referred to as a "miss". Misses that occur along an edge may constitute a pattern of region misses, which may imply or confirm a probability of the presence of an overlay. In some example implementations, and overlay detection scheme may declare a presence of the overlay when a pattern of misses is detected. For example, but not by way of limitation, consider a pattern P of misses that is a set of regions for which the watermarks failed to encode, or fingerprints were not found in the fingerprint database. For each pattern P of misses that is interpreted as an overlay being present, all patterns P', for which P is a subset, are also considered as having an overlay present. Accordingly, if all regions along an edge miss, and if other regions miss that are not along the edge, the overlay detector would declare the presence of an overlay. In such examples, if noise causes additional regions to miss, the presence of an overlay will still be declared, as there is a bias toward higher recall (e.g., occasionally detection of a presence of an overlay when none is in fact present may be preferable, as compared with the detector indicating that no overlay exists when the overlay is in fact present).

The foregoing example implementation may have various benefits and advantages. For example, but not by way of limitation, the example implementations that employ video watermarks for overlay detection may retain the benefits of the video watermarking approach, while substantially resolving the related art obstructed user interface problem. Further, the pattern matching approach of the example implementation may infer regions that are likely to include an overlay, based on the patterns of regions that have been missed. Accordingly, this example implementation may permit dynamic ad insertion in the regions that do not miss. However watermarks may be removed by the set-top box or by any entity in the video distribution path.

According to another example implementation, the overlay detection approach may declare a potential presence of an overlay, based on a failure of watermark decoding for all of the regions along any of the edges, independent of whether or not watermark decoding occurs successfully in other regions. Further, and as shown in FIG. 14, the television display 1401 may be provided with a grid that divides the frame into plural regions, such as for example 9 rectangles. The grid is not visible to the user. More specifically, the grid provides bounded regions in which a watermark may be positioned on an incoming video stream. According to one example implementation, a watermark may be associated with each of the regions. The watermarks may be independent of one another, such that if any subset of the regions is distorted, such as by an overlaying user interface element or the like, any regions that are not occluded by the overlaying user interface element will remain unaffected. In other words, for the regions that are covered by the overlaying user face element, the watermark will not be detected, but the watermark will continue to be detected in other regions.

For example, as shown in FIG. 14, the lower three regions 1415, 1417, 1419 of the grid are denoted with an "X", which is indicative of a failure of the watermark, due to the incoming video stream having been completely covered by the overlaying user interface element 1405. Depending on the robustness of the video watermarking algorithm, the watermark decoder may fail to decode the watermarks embedded in the middle row of regions, in cases of encroachment of the navigation bar 1405 along just a partial, lower edge of the middle row of regions of the grid. Further, and also depending on the robustness of the video watermarking algorithm, the watermark decoder may also fail for the time indicator 1407, which only partially covers a region of the grid.

While the foregoing example implementations are directed to failure of the watermark when a region is completely covered or occluded, the present inventive concept is not limited thereto, and other variations may be provided in combination therewith, or substituted therefor. For example, but not by way of limitation, an overlay user element may only modify a single region (e.g., time indicator 1407). On the other hand, the detection scheme may require plural regions be modified by the overlay user element to indicate the presence of an overlay. Alternatively, the example implementations may operate such that where any two adjacent regions for which the watermark fails to decode, a positive indication of overlay presence is provided. In an alternative implementation, the overlay detector indicates the presence of an overlay when the watermark decoder fails to decode watermarks for any set containing more than one region along the same edge.

Further, while the foregoing example implementations illustrate a grid of rectangles or quadrilaterals, the example implementations may be modified for a television display of a different shape, and may include a grid that is subdivided into regions having the same shape or different shapes, or the same shape having different sizes, or the same size. Further, the grid need not be symmetrical, or have the same number of rows and columns. For example, a 5×3 grid may be used instead of a 3×3 grid. Optionally, regions may be scaled back from the edges of the television display, which may avoid distortions that may be caused on the edges of frame buffers on some TV platforms. Further, to potentially reduce computational costs, the regions need not be contiguous or cover the complete television display; space may be provided between regions, wherein the space between the regions is not sampled. Optionally, the regions could be arranged in an alternating pattern, such as checkerboard, such that only a subset of the regions are included in the computation. The regions may be arranged into any pattern, so as to provide sufficient regions along one or more of the edges, so as to detect overlay presence.

Further, usage patterns by the user may be considered, and the selected regions for the computation may be modified, either periodically or dynamically, to account for changes in user equipment, such as a change in the set-top box, changes in viewing patterns, or other changes that may impact the presence of the overlay user element.

According to still other example implementations, the encoding and decoding may be associated with video watermarks. For example, but not by way of limitation, video watermarks may be provided that span a Group Of Frames (GOF). More specifically, watermark encoders may encode a watermark across consecutive frames, such that the decoder must process multiple frames to decode the watermark. Accordingly, while the foregoing example implementations may be disclosed as processing a single frame, a multiple-frame processing implementation may be substituted therefor (e.g., replacement of single frame with processing the GOF). Accordingly, a "GOF miss" may refer to the video decoder failing to decode the watermark for a group of frames.

Inferring the presence of an overlay may then be accomplished by looking at the pattern of GOF misses.

Additionally, the example implementations may detect the presence of overlays based not only on a single frame, but over a plurality of frames, over time. Such overlay detection schemes, herein referred to as "time-based overlay detection", determine the presence of overlays based on a plurality of frames.

The example implementations may include one or more time-based overlay detection schemes. For example but not by way of limitation, example implementations may include the following null hypotheses:

1. if k sampled frames in a row detect an overlay, then reject the null hypothesis that there is no overlay, and declare an overlay
2. if k out of n sampled frames in a time window of frames n wide detect an overlay, then reject the null hypothesis that there is no overlay, and declare an overlay
3. if p % of the sampled frames occurring in the last t seconds detect an overlay, then reject the null hypothesis that there is no overlay The foregoing examples are illustrative of statistical tests which may be employed to reject a null hypothesis that there is no overlay, given the sequence of frame level overlay detections over a time period. However, as would be understood by those skilled in the art, other statistical approaches may be employed without departing from the inventive scope.

As used herein, the term "sample frames" refers to the frames that are actually sampled. Such frames in a video pipeline may be a subset of the frames, and may reflect a rate limit, such as, for example but not by way of limitation, m frames per second, or a minimum inter-sample time of T. The subset of sampled frames may also be determined based on available resources in a video pipeline. In an implementation having sufficient resource availability, overlay detection may be sampled for each frame. Accordingly, the term "sample frames" is not limited to "consecutive frames".

Further, overlay user elements may be correlated over time based on the position of the overlay user element. For example, if frame level overlay detection only detects the overlay menu only on a bottom edge of a frame, then it may be unlikely that the overlay menu would be positioned in a substantially different portion of the display on consecutive frame samples. Accordingly, the foregoing null hypothesis tests may include a constraint such as "detect an overlay", to "detect an overlay in the same location". More specifically, "in the same location" refers to having the same bounds on the location of the overlay, as the example implementations that determine the presence of region misses in patterns will be able to determine the regions that are likely to contain an overlay user element. Accordingly, the regions that are likely to contain an overlay may establish bounds on a likely location of an overlay.

For example, but not by way of limitation, the forgoing null hypothesis (1) may include the scope of, if k sampled frames in a row indicate the presence of an overlay in the same location, then reject the null hypothesis that there is no overlay, and declare an overlay. Similar modifications may be made to novel hypotheses (2) and (3), and any other statistical test that one skilled in the art at the time of the invention might employ, to reject a null hypothesis that no overlays are present in a region or regions of interest.

The foregoing example implementation may have various benefits and advantages, as explained above with respect to the use of video watermarks. Additionally, because overlay user elements may span more than one frame over time, the foregoing example implementation may result in more precise detection, using the time-based overlay detection, with minimal degradation in recall. As a result, the increase in detection precision may lead to fewer incorrect teardown errors, and a higher recall may lead to fewer obstructed user interface errors. Further, although time-based overlay detection requires more than one frame to determine a presence of overlay, by delaying the video pipeline (e.g., by a few frames), the additional time required to determine the presence of overlays may be offset, so as to cause minimal or non-perceptible impact on the display provided to the user.

According to other example implementations, artificial intelligence approaches may be used instead of statistics-based approaches. For example, but not by way of limitation a machine learning-based approach, such as a recurrent neural network, may be employed to the sequence, and/or the positions, of frame level overlay detections, to classify whether the sequence of sampled frames contain an overlay user interface element. Accordingly, this example implementation may be able to detect a presence of overlays with higher accuracy as compared to statistical methods, although the approach may require additional computational resources.

As a further optional approach according to the example implementations, the watermarks may be independent, as explained above, or erasure coded. As is understood to those skilled in the art, an erasure code is a forward error correction code under the assumption of bit erasures, rather than bit errors. A message of k symbols is transformed into a longer message, e.g., code word, with n symbols, such that the original message can be recovered from a subset of n symbols.

For example, for each of the regions, the watermarks together include an erasure coded message, such that if the watermarks in any k of the n regions can be decoded, then the entire original message is decodable. The encoded message may include, but is not limited to, a content ID of the content, a timestamp, a channel name, identification information associated with the content publisher, copyright, ad insertion policy, description of future insertion points for ads, such as beginning time, and time and/or duration, or other content or information as would be understood by those skilled in the art. According to this example implementation, a watermark for a region that cannot be decoded may be characterized as an erasure. The erasure is indicative of the presence of an overlay, in a manner analogous to that shown above with respect to FIG. 14, e.g. pattern of X's. The watermarking may encode short messages, without modifying the video perceptively, or introducing frailty to noise. By employing erasure coding, a longer message may be encoded, while maintaining the degree of robustness associated with the above example watermarking approaches.

While the foregoing example implementations disclose the use of watermarks to detect overlays, other approaches may be employed. For example, but not by way of limitation, fingerprinting may be used. As explained above, fingerprinting can be used to identify content. The fingerprints that are generated from the video are compared against a fingerprint database. If the fingerprints generated from the audio substantially match the fingerprints in the fingerprint database, then it is determined that the user is watching content, based on the association between the fingerprint in the fingerprint database and content. Thus, fingerprinting provides an answer to "what in the universe of the fingerprint database content is the user watching?".

Figure 15:
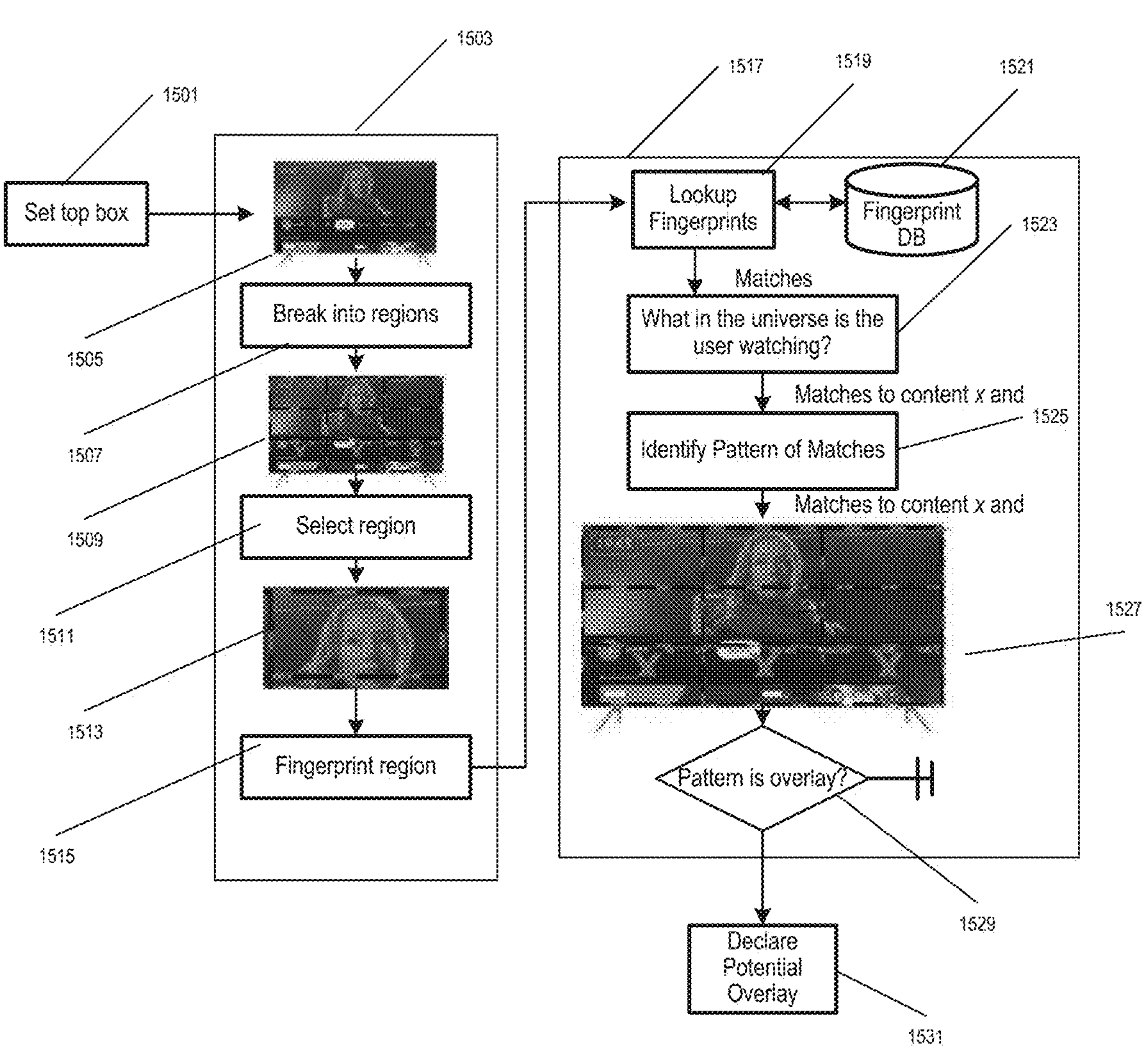

FIG. 15 illustrates an example implementation 1500, associated with overlay detection by use of fingerprints. A set-top box 1501 provides a broadcast stream. As shown in 1503, a display 1505 may include the broadcast stream, as well as an overlay, such as an overlay menu, and an overlay time indicator. At 1507, the display 1505 is broken into regions, such as is shown in 1509. At 1511, a region is selected, as shown in magnified form at 1513. At 1515, a fingerprinting operation is performed for the region.

As shown at 1517, a lookup operation 1519 is performed, such that the fingerprint at the region is compared to a fingerprint database 1521 for matches. At 1523, an identity of the content is determined, for the fingerprint of the selected region of the frame matching fingerprint information in the database 1521. At 1525, a pattern of matches is identified, wherein there is a pattern of matches to the identified content, as well as misses. Accordingly, as shown at 1527, for the pattern of matches not being present, a determination is made that an overlay is present in those regions, as indicated by X. At 1529, for the regions having a pattern of misses, and the matches, a determination is made as to whether a pattern constitutes an overlay. If it is determined that the pattern constitutes an overlay, at 1531, an overlay is declared to be present.

With watermarks, the detections may be made locally to the television. However, with fingerprints, the television must provide the fingerprints to a server, which compares the fingerprints from each frame against a fingerprint database. For a situation where the overlay does not obstruct a portion of the frame, the fingerprints may or may not match the fingerprints in the fingerprint database. On the other hand, if an overlay obstructs a portion of the frame, then the fingerprints for the obstructed regions are not likely to appear in the fingerprint database. Regions of the display that include fingerprints that fail to match the fingerprint database may be marked, such as with X as illustrated above, to indicate that the fingerprint associated with that region was not found in the fingerprint database. According to some example implementations, if the regions along an edge fail to match, while remaining regions do match, so as to be able to provide a confident indication that the television is rendering content associated with the match, the potential presence of an overlay may be determined.

According to this example implementation, there may be various benefits and advantages. For example, but not by way of limitation, the fingerprints may function, even if the watermarks have been removed from the video. Further, the fingerprints are not dependent on watermarks being introduced into the video in the production or distribution path.

As yet another example implementation, to address potential limitations associated with the use of a single fingerprint algorithm, as described further above, multiple fingerprint algorithms may be employed. This approach may have various benefits and advantages. For example, but not by way of limitation, by using multiple fingerprint algorithms, high differentiating power for precision, as well as high match rate for recall, may be achieved. The differentiating fingerprint can be used to identify video content. Once the video content has been identified, high match rate fingerprints may be used to determine which regions of the display are likely to contain an overlay. Although the high match rate fingerprints may be too tolerant to noise to be able to identify content from the potential candidates within a fingerprint database, the high match fingerprints may be sufficient to distinguish the video content from a substantial visual difference or distortion, as would occur in the case of an overlay that is present in one or more regions.

According to some example implementations, the pattern of misses and hits with the high matching fingerprints may be used to infer which subset of regions is likely to include an overlay. For example, but not by way of limitation, if an overlay is present along the edge, it is more likely that all of the regions along the edge will miss, whereas the high match rate of the high match rate fingerprints may cause all of the unaffected regions to hit with respect to the video content.

This example approach may have various benefits and advantages. For example, but not by way of limitation, different fingerprint algorithms may be used for answering the questions of "what in the universe of content in the database is the user watching?", and, "is an overlay present?". Thus, each of the fingerprint algorithms may be tailored or optimized for those respective functions. To determine the content that the user is watching, highly differentiating fingerprints are required, so as to distinguish between the many pieces of content in the fingerprint database. On the other hand, to determine whether an overlay is present, the fingerprints of the content that was identified is compared against the fingerprints for the reference version of the content. In that case, the scope is much smaller, and thus, the fingerprints do not need to be as sensitive for fine details, which enables much higher match rates. Further, the higher differentiating power provides for determining the correct underlying content to enable detection of overlays. Higher match rates may result in waiting fewer frames before declaring a presence of an overlay. As a result, there is a lower chance of an obstructed interface error. Moreover, the occurrence of incorrect teardowns due to a false detection of an overlay is reduced.

The inventive concept is not limited to the foregoing example implementations, and other modifications may be provided, as would be understood by those skilled in the art. For example, but not by way of limitation, the foregoing example implementations that use independent watermarks may be combined with, or substituted for, example implementations that use fingerprinting. Similarly, fingerprinting may be employed in the forgoing time-based example implementations, in place of, or in combination with, the watermarking. Additionally, the artificial intelligence approaches described herein are not limited to use in watermarking, and as would be understood by those skilled in the art, artificial intelligence approaches, including machine learning based variance can, may employ fingerprinting, instead of or in combination with watermarking.

To account for the presence of low information regions, the example implementations may implement rules. For example, the matching operations may not consider black, white or other low information regions as counting as a match, since solid color such as black and white may match many pieces of content. In other words, black, white, and other low information regions are ignored when answering the question "what in the universe of content?" because black and white may return many possible pieces of content as candidates. On the other hand, when asking "is there an overlay present given that the user is watching x?" it is not necessary to to differentiate across a large database, and further, it may be advantageous to bias the classifier towards stating the presence of an overlay. Accordingly, black, white, or other colors would be included as misses when detecting the presence of an overlay. Moreover, for any pattern P of misses for which the presence of an overlay is declared, any pattern P' of misses such that P is in P' may also be interpreted as the video containing an overlay.

Incorporating such pieces of content into the matching protocol may result in non-detection of the presence of an overlay because, for example, if a region is determined to be matching based on the presence of black or white pieces of content.

Optionally, the presence of an overlay on the broadcast video may be determined based on the region's matching properties of known overlays. For example, a template may be used having a pattern associated with a known STB menu. This approach may be employed by, but is not limited to, fingerprints of user interface elements. More specifically, a fingerprint algorithm that identifies user interface elements may employ different features as compared with a fingerprint algorithm for broadcast video content. This is because overlaying menus may have significantly low temporal or spatial information, be text heavy, have sharp edges, or other distinguishing attributes.

Example approaches may include local algorithms in combination with a watermark technology, to increase the speed of detection of the overlay and content change in the TV device, without requiring dependence on the ACR itself. For example, a local algorithm performed on the TV device itself, such as region analysis, black frame detection, identification of color-space changes associated with sudden scene alterations, or the like, may be performed at the television device itself. These operations may be performed alone or in combination with the foregoing example matching protocol.

In some situations, the television may be in the process of tuning, particularly with over the air broadcast. According to the example implementations, detection of a presence of an overlay would avoid the necessity to receive a signal from the subsystems within the television other than the watermark decoder or fingerprint generator of the television, to indicate the presence of the overlay. As a result, the problems and disadvantages with requiring an explicit signal from different systems within the television is avoided. Further, the need for integration with subsystems with the television, other than the broadcast video or the broadcast audio, by the television manufacturer is also avoided.

While the foregoing example implementations are directed to prevention of advertisement insertion when overlays are present on a screen, the present inventive concept is not limited thereto. For example, other content than an STB menu may be considered by the matching protocol, such as pop-ups, emergency messages from other devices, communications associated with other products, such as home devices, and the like.

Figure 16:
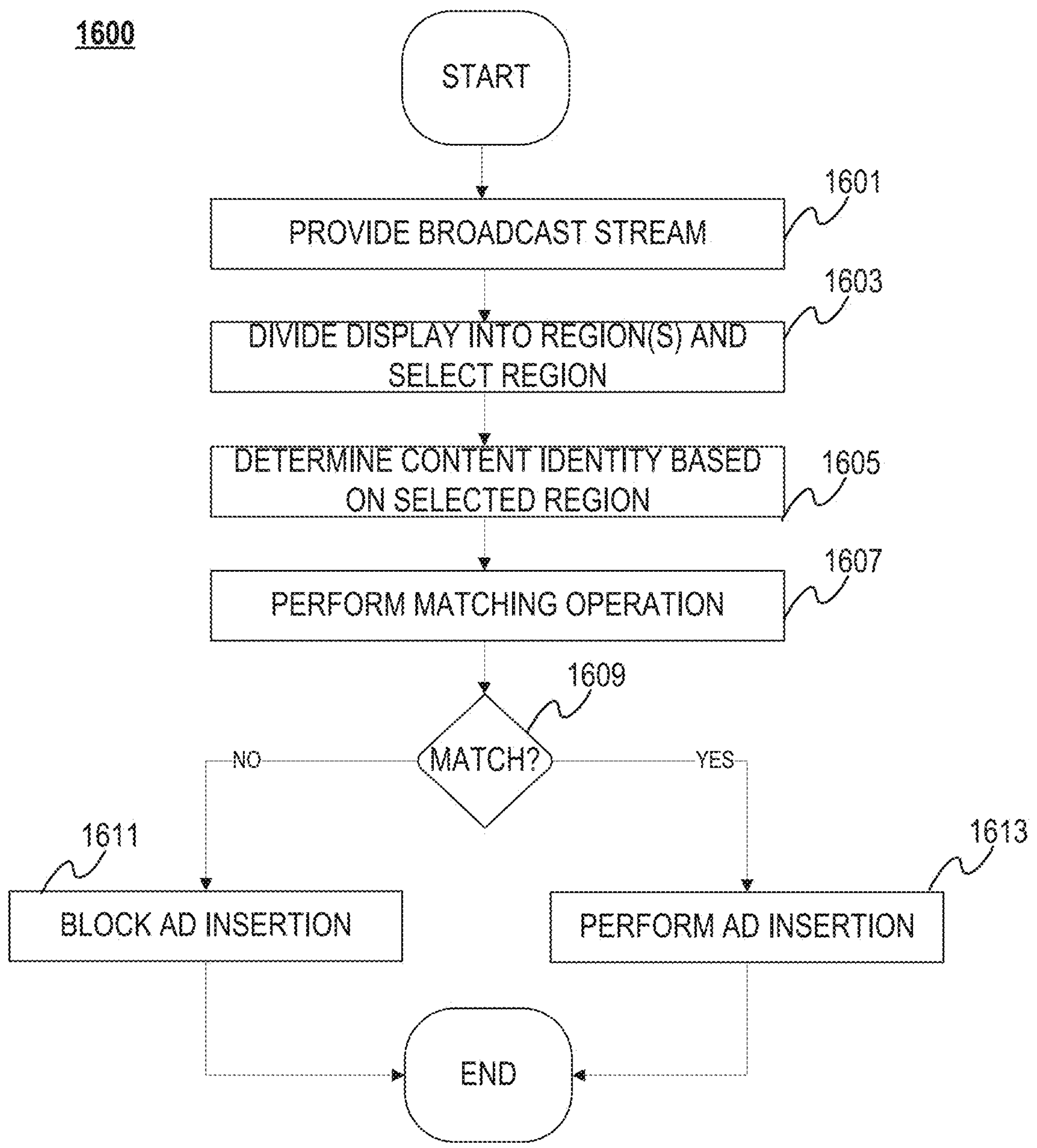
FIG. 16 illustrates operations according to an example implementation.

FIG. 16 illustrates a method 1600 according to an example implementation. More specifically, the method 1600 relates to overlay detection, for example by the use of fingerprints.

At 1601, a broadcast stream is provided, such as by a set-top box. For example, a display may include the broadcast stream, as well as an overlay, such as an overlay menu, and an overlay time indicator.

At 1603, the display is divided into one or more regions, and a region is selected.

At 1605, a content determination operation is performed (e.g., fingerprinting). For example, the content determination may include a lookup operation being performed, such that the fingerprint at the region is compared to a fingerprint database for matches. Thus, an identity of the content is determined, such as for the fingerprint of the selected region of the frame matching fingerprint information in the database. However, the example implementations are not limited thereto, and other approaches as disclosed in the example implements herein may be employed in combination or substitution.

At 1607, a matching operation is performed at or near the time of the ad insertion, to determine whether the broadcast stream matches the intended broadcast stream for the ad insertion. For example, a pattern of matches is identified, wherein there is a pattern of matches to the identified content, as well as misses.

At 1609, a determination is made as to whether the match is present based on the matching operation of 1607.

At 1611, for the match not being present as determined in 1609, a determination is made that the content is not suitable for the digital ad insertion. For example, for the pattern of matches not being present, a determination is made that an overlay is present in those regions where the match is not present. Alternatively, a non-matching situation may be identified based on the content of the broadcast stream being different (e.g., change of channel). Accordingly, the content is not suitable for digital ad insertion, and the digital ad insertion is not performed. For example, for the regions having a pattern of misses and matches, a determination is made as to whether a pattern constitutes an overlay. If it is determined that the pattern constitutes an overlay, an overlay is declared to be present and a teardown may be performed.

At 1613, for the determination that the content is suitable for digital ad insertion, the digital ad insertion is performed.

Figure 17:
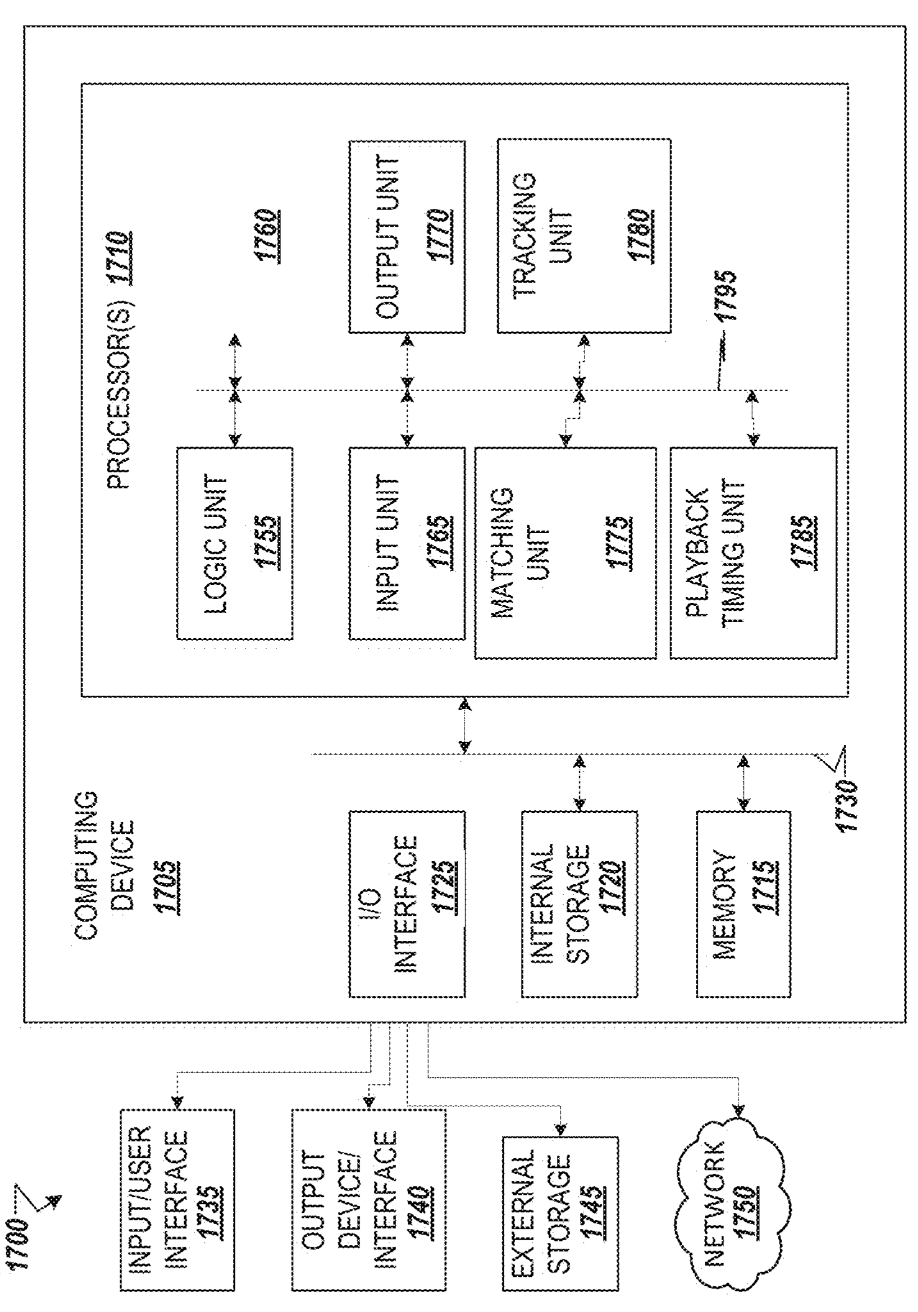
FIG. 17 illustrates an example computing environment with an example computer device suitable for use in some example implementations.

FIG. 17 illustrates an example computing environment 1700 with an example computer device 1705 suitable for use in some example implementations. Computing device 1705 in computing environment 1700 can include one or more processing units, cores, or processors 1710, memory 1715 (e.g., RAM, ROM, and/or the like), internal storage 1720 (e.g., magnetic, optical, solid state storage, and/or organic), and/or I/O interface 1725, any of which can be coupled on a communication mechanism or bus 1730 for communicating information or embedded in the computing device 1705.

Computing device 1705 can be communicatively coupled to input/interface 1735 and output device/interface 1740. Either one or both of input/interface 1735 and output device/interface 1740 can be a wired or wireless interface and can be detachable. Input/interface 1735 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 1740 may include a display, television, monitor, printer, speaker, braille, or the like. In some example implementations, input/interface 1735 (e.g., user interface) and output device/interface 1740 can be embedded with, or physically coupled to, the computing device 1705. In other example implementations, other computing devices may function as, or provide the functions of, an input/interface 1735 and output device/interface 1740 for a computing device 1705.

Examples of computing device 1705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 1705 can be communicatively coupled (e.g., via I/O interface 1725) to external storage 1745 and network 1750 for communicating with any number of networked components, devices, and systems, including one or more computing devices of the same or different configuration. Computing device 1705 or any connected computing device can be functioning as, providing services of, or referred to as, a server, client, thin server, general machine, special-purpose machine, or another label. For example but not by way of limitation, network 1750 may include the blockchain network, and/or the cloud.

I/O interface 1725 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and networks in computing environment 1700. Network 1750 can be any network or combination of networks (e.g., the Internet, local area network, wide area network, a telephonic network, a cellular network, satellite network, and the like).

Computing device 1705 can use and/or communicate using computer-usable or computer-readable media, including transitory media and non-transitory media. Transitory media includes transmission media (e.g., metal cables, fiber optics), signals, carrier waves, and the like. Non-transitory media includes magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1710 can execute under any operating system (OS) (not shown), in a native or virtual environment. One or more applications can be deployed that include logic unit 1755, application programming interface (API) unit 1760, input unit 1765, output unit 1770, overlay detection unit 1775, channel change detection unit 1780, content identification unit 1785, and inter-unit communication mechanism 1795 for the different units to communicate with each other, with the OS, and with other applications (not shown).

For example, the overlay detection unit 1775, the channel change detection unit 1780, and the content identification unit 1785 may implement one or more processes shown above with respect to the structures described above. The described units and elements can be varied in design, function, configuration, or implementation and are not limited to the descriptions provided.

In some example implementations, when information or an execution instruction is received by API unit 1760, it may be communicated to one or more other units (e.g., logic unit 1755, input unit 1765, overlay detection unit 1775, channel change detection unit 1780, and content identification unit 1785).

For example, the overlay detection unit 1775 may receive and process information from a third party resource and/or a document template, including extraction of information descriptors from the document template. An output of the overlay detection unit 1775 may provide a payload, which is provided to the channel change detection unit 1780, which detects an object with live video, by applying the object recognizer to output an identity of an item in the live video, with respect to information included in the document. Additionally, the content identification unit 1785 may provide information in response to a request, based on the information obtained from the overlay detection unit 1775 and the channel change detection unit 1780.

In some instances, the logic unit 1755 may be configured to control the information flow among the units and direct the services provided by API unit 1760, input unit 1765, overlay detection unit 1775, channel change detection unit 1780, and content identification unit 1785 in some example implementations described above. For example, the flow of one or more processes or implementations may be controlled by logic unit 1755 alone or in conjunction with API unit 1760.

Figure 18:
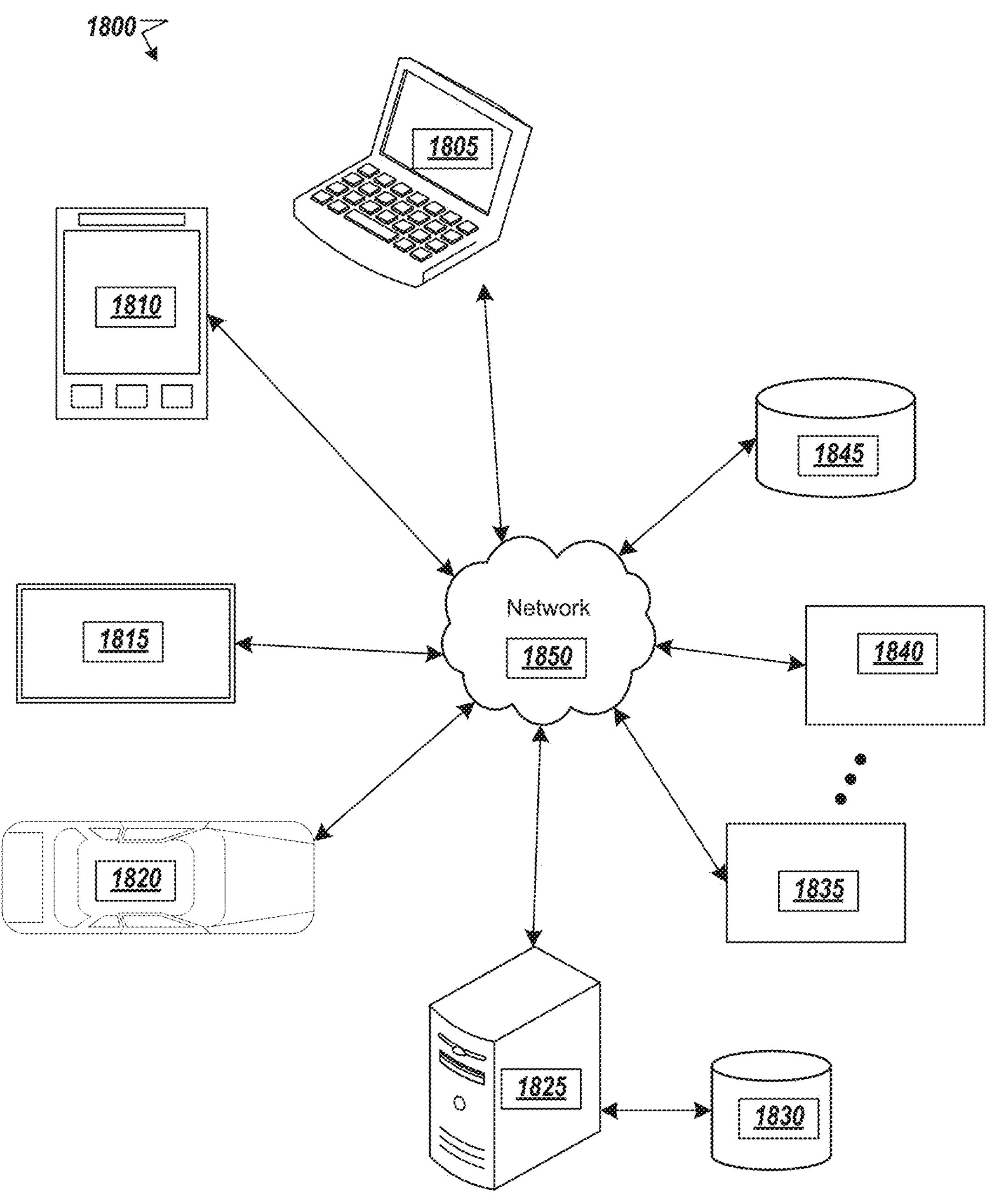
FIG. 18 shows an example environment suitable for some example implementations.

FIG. 18 shows an example environment suitable for some example implementations. Environment 1800 includes devices 1805-1845, and each is communicatively connected to at least one other device via, for example, network 1860 (e.g., by wired and/or wireless connections). Some devices may be communicatively connected to one or more storage devices 1830 and 1845.

An example of one or more devices 1805-1845 may be computing device 1705 described in FIG. 17, respectively. Devices 1805-1845 may include, but are not limited to, a computer 1805 (e.g., a laptop computing device) having a monitor and an associated webcam as explained above, a mobile device 1810 (e.g., smartphone or tablet), a television 1815, a device associated with a vehicle 1820, a server computer 1825, computing devices 1835-1840, storage devices 1830 and 1845.

In some implementations, devices 1805-1820 may be considered user devices associated with the users who may be remotely receiving a broadcast, and providing the user with settings and an interface. Devices 1825-1845 may be devices associated with service providers (e.g., used to store and process information associated with the document template, third party applications, or the like).

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method to control switching between a first buffer configured to provide a first content stream to a video display and a second buffer configured to provide an advertisement to the video display, such method comprising using at least one hardware processor to:

while the first buffer is providing the first content stream to the video display, decode a watermark within the first content stream to retrieve an identifier of the first content stream;

acquire an insertion point of the first content stream using the identifier;

for a prescribed time range prior to the insertion point being reached in the first content stream, pre-buffer the advertisement in the second buffer; and for the insertion point being reached in the first content stream, monitor the first content stream for a presence of a first channel change user interface within the first content stream, if the presence of the first channel change user interface is detected, prevent switching from the first buffer to the second buffer, and if the presence of the first channel change user interface is not detected, switch from the first buffer to the second buffer such that the advertisement is provided to the video display, wherein the at least one hardware processor is further configured to:

while the second buffer is providing the advertisement to the video display, monitor the first content stream for a channel change and for a presence of a second channel change user interface;

if the channel change or the presence of the second channel change user interface is detected prior to the advertisement reaching an end point, switch from the second buffer to the first buffer such that the first content stream is provided to the video display; and if neither the channel change nor the presence of the second channel change user interface is detected prior to the advertisement reaching an end point, switch from the second buffer to the first buffer when the advertisement reaches an end point such that the first content stream is provided to the video display.

2. The method of claim 1, further comprising using the at least one hardware processor to query a first server to acquire the insertion point and to query a second server to acquire the advertisement.

3. The method of claim 1, wherein the identifier is either a content identifier that identifies a current content or a channel identifier that identifies a current channel represented in the first content stream.

4. The method of claim 1, wherein the first channel change within the first content stream is detected based on a change in the identifier related to the first content stream.

5. The method of claim 1, wherein the watermark is entirely embedded within an audio of the first content stream.

6. The method of claim 1, wherein the watermark is embedded within a video of the first content stream.

7. The method of claim 6, wherein, in each of a plurality of frames in the first content stream, the watermark comprises a plurality of watermarks, and each of the plurality of watermarks is embedded in a different one of a plurality of regions of that frame.

8. The method of claim 7, wherein the plurality of watermarks in each of the plurality of frames are erasure coded, such that information encoded in the plurality of watermarks can be decoded with fewer than all of the plurality of watermarks.

9. The method of claim 7, wherein each of the plurality of watermarks in each of the plurality of frames is independently decodable.

10. The method of claim 9, further comprising using the at least one hardware processor to, for each of the plurality of frames, when one or more, but not all, of the plurality of watermarks are undecodable:

identify a subset of the plurality of regions in which the one or more undecodable watermarks are embedded; and determine whether or not an overlay user interface is present in the frame based on a pattern of the identified subset of the plurality of regions.

11. The method of claim 10, further comprising using the at least one hardware processor to determine that an overlay user interface is present in the frame when two or more regions in the identified subset are along a same edge of the frame.

12. The method of claim 10, further comprising using the at least one hardware processor to delay the first content stream for at least a time required to determine whether or not the overlay user interface is present.

13. The method of claim 1, wherein the presence of an overlay user interface within the first content stream is detected by, for each of a plurality of frames in the first content stream:

generating a plurality of fingerprints from the frame, wherein each of the plurality of fingerprints represents a different one of a plurality of regions of the frame;

providing the plurality of fingerprints to a server; and determining whether or not an overlay user interface is present in the frame by determining that at least one but less than all of the plurality of fingerprints match reference fingerprints associated with the plurality of regions.

14. A non-transitory computer-readable medium having instructions stored thereon, wherein the instructions, when executed by a processor, cause the processor to:

while a first buffer is providing a first content stream to a video display, generate a first fingerprint from the first content stream;

provide the first fingerprint to a server to acquire an identity of a content in the first content stream;

acquire an insertion point of the first content stream using the identity;

for a prescribed time range prior to the insertion point being reached in the first content stream, pre-buffer an advertisement in a second buffer; and for the insertion point being reached in the first content stream, monitor the first content stream for a presence of a first channel change user interface within the first content stream, if the presence of the first channel change user interface is detected, prevent switching from the first buffer to the second buffer, and if the presence of the first channel change user interface is not detected, switch from the first buffer to the second buffer such that the advertisement is provided to the video display, wherein the processor is further configured to:

while the second buffer is providing the advertisement to the video display, monitor the first content stream for a channel change and for a presence of a second channel change user interface, if the channel change or the presence of the second channel change user interface is detected prior to the advertisement reaching an end point, switch from the second buffer to the first buffer such that the first content stream is provided to the video display, and if neither the channel change nor the presence of the second channel change user interface is detected prior to the advertisement reaching an end point, switch from the second buffer to the first buffer when the advertisement reaches an end point such that the first content stream is provided to the video display.

15. The non-transitory computer-readable medium of claim 14, wherein the channel change or the presence of the second channel change user interface within the first content stream is detected by generating a second fingerprint from the first content stream and comparing the second fingerprint to reference fingerprints associated with the identity of the content in the first content stream.

16. The non-transitory computer-readable medium of claim 14, wherein the channel change or the presence of the second channel change user interface within the first content stream is detected by:

generating a second fingerprint from the first content stream and comparing the second fingerprint against a special fingerprint associated with a transitional display; and if the second fingerprint matches the special fingerprint, determine the channel change or the presence of the second channel change user interface is detected, if the second fingerprint matches the special fingerprint.

17. The non-transitory computer-readable medium of claim 16, wherein the transitional display comprises one or more black frames.

18. The non-transitory computer-readable medium of claim 14, wherein the processor is further configured to:

for the identity of a current content being acquired, query an insertion point server to acquire a sequence of trigger fingerprints; and determine the insertion point based on a detection of the sequence of trigger fingerprints in the first fingerprint, wherein the first fingerprint comprises a plurality of fingerprints.

* * * * *